US011615755B1

(12) United States Patent
Marks et al.

(10) Patent No.: US 11,615,755 B1
(45) Date of Patent: Mar. 28, 2023

(54) INCREASING RESOLUTION AND LUMINANCE OF A DISPLAY

(71) Applicant: Unity Technologies SF, San Francisco, CA (US)

(72) Inventors: Joseph W. Marks, Boston, MA (US); Luca Fascione, Wellington (NZ); Kimball D. Thurston, III, Wellington (NZ); Millie Maier, Wellington (NZ); Kenneth Gimpelson, Wellington (NZ); Dejan Momcilovic, Wellington (NZ); Keith F. Miller, Wellington (NZ); Peter M. Hillman, Wellington (NZ); Jonathan S. Swartz, Wellington (NZ); Carter Bart Sullivan, Benicia, CA (US)

(73) Assignee: Unity Technologies SF, San Francisco, CA (US)

( * ) Notice: Subject to any disclaimer, the term of this patent is extended or adjusted under 35 U.S.C. 154(b) by 0 days.

(21) Appl. No.: 17/883,396

(22) Filed: Aug. 8, 2022

Related U.S. Application Data

(63) Continuation of application No. 17/537,908, filed on Nov. 30, 2021, now Pat. No. 11,443,676.

(60) Provisional application No. 63/283,902, filed on Nov. 29, 2021.

(51) Int. Cl.
*G09G 3/34* (2006.01)
*G06T 7/10* (2017.01)
(Continued)

(52) U.S. Cl.
CPC ............... *G09G 3/346* (2013.01); *G06T 5/50* (2013.01); *G06T 7/10* (2017.01); *G06T 7/70* (2017.01); *G06V 10/22* (2022.01); *G09G 3/20* (2013.01); *H04N 5/265* (2013.01); *H04N 5/76* (2013.01); *H04N 7/0117* (2013.01); *H04N 7/0135* (2013.01); *H04N 9/64* (2013.01);
(Continued)

(58) Field of Classification Search
CPC .......... G09G 3/346; G09G 3/20; G06V 10/22; G06T 7/10; G06T 5/50; H04N 5/265; H04N 5/76; H04N 7/0117; H04N 7/0135; H04N 9/64
See application file for complete search history.

(56) References Cited

U.S. PATENT DOCUMENTS 10,410,566 B1  9/2019  Kerdemelidis
10,623,705 B2  4/2020  Vaziri
(Continued)

*Primary Examiner* — Abbas I Abdulselam
(74) *Attorney, Agent, or Firm* — Perkins Coie LLP

(57) ABSTRACT

The disclosed system modifies luminance of a display associated with a selective screen. The display provides a camera with an image having resolution higher than the resolution of the display by presenting multiple images while the selective screen enables light from different portions of the multiple images to reach the camera. The resulting luminance of the recorded image is lower than a combination of luminance values of the multiple images. The processor obtains a criterion indicating a property of the input image where image detail is unnecessary. The processor detects a region of the input image satisfying the criterion, and determines a region of the selective screen corresponding to the region of the input image. The processor increases the luminance of the display by disabling the region of the selective screen corresponding to the region of the input image.

20 Claims, 29 Drawing Sheets

(51) Int. Cl.
  *G06V 10/22* (2022.01)
  *G09G 3/20* (2006.01)
  *G06T 7/70* (2017.01)
  *G06T 5/50* (2006.01)
  *H04N 5/265* (2006.01)
  *H04N 5/76* (2006.01)
  *H04N 7/01* (2006.01)
  *H04N 9/64* (2023.01)

(52) U.S. Cl.
  CPC ............. *G06T 2207/10016* (2013.01); *G06T 2207/10024* (2013.01); *G06T 2207/20212* (2013.01); *G09G 2300/026* (2013.01); *G09G 2320/0233* (2013.01); *G09G 2320/0686* (2013.01); *G09G 2340/0407* (2013.01); *G09G 2340/0464* (2013.01)

(56) References Cited

U.S. PATENT DOCUMENTS

| | | |
|---|---|---|
| 10,816,939 B1 | 10/2020 | Coleman |
| 11,056,030 B1 | 7/2021 | Melakari et al. |
| 11,282,472 B2 | 3/2022 | Hu et al. |
| 11,443,676 B1 | 9/2022 | Marks et al. |
| 2006/0209057 A1 | 9/2006 | Damera-Venkata et al. |
| 2008/0143978 A1 | 6/2008 | Damera-Venkata et al. |
| 2008/0284677 A1 | 11/2008 | Whitehead et al. |
| 2009/0231418 A1* | 9/2009 | Higuchi .................... G06T 3/40 345/626 |
| 2013/0286053 A1 | 10/2013 | Fleck et al. |
| 2015/0049004 A1 | 2/2015 | Deering et al. |
| 2015/0103250 A1 | 4/2015 | Watanabe et al. |
| 2016/0232827 A1 | 8/2016 | Chen et al. |
| 2016/0261838 A1 | 9/2016 | Ranieri et al. |
| 2016/0301918 A1 | 10/2016 | Mukhtarov et al. |
| 2017/0347091 A1 | 11/2017 | Madhani et al. |
| 2019/0167231 A1 | 6/2019 | Kelly |
| 2019/0243134 A1 | 8/2019 | Perreault et al. |
| 2020/0245960 A1 | 8/2020 | Richter et al. |
| 2020/0272232 A1 | 8/2020 | Lussier et al. |
| 2021/0011553 A1 | 1/2021 | Lussier et al. |
| 2021/0033859 A1 | 2/2021 | Gotsch |
| 2021/0158021 A1 | 5/2021 | Wu et al. |
| 2021/0248952 A1 | 8/2021 | Melakari et al. |
| 2021/0258510 A1 | 8/2021 | Woodall et al. |
| 2021/0356744 A1 | 11/2021 | Kempf et al. |

\* cited by examiner

INCREASING RESOLUTION AND LUMINANCE OF A DISPLAY

CROSS-REFERENCE TO RELATED APPLICATIONS

This application is a continuation of U.S. patent application Ser. No. 17/537,908 filed Nov. 30, 2021, which claims priority to and the benefit of U.S. provisional patent application Ser. No. 63/283,902 filed Nov. 29, 2021, both of which are incorporated herein by reference in their entirety.

BACKGROUND

Large-scales displays such as light emitting diode (LED) walls can be used as backgrounds in filmmaking. However, large-scale displays tend to not have very high resolution for several reasons. One reason is that reducing the size of the light emitting diodes, to increase the resolution of the large-scale display, is difficult. In addition, bandwidth between the rendering engine and the large-scale display limits the resolution of the image that can be sent to the LED wall.

SUMMARY

Disclosed here is a system and method to increase resolution of a display, such as an LED wall. The display operates at a predetermined frequency by displaying a first image at a first time and a second image at a second time. A selective screen disposed between the display and the light receiver can include multiple light transmitting elements, such as pixel masks. A light transmitting element A can redirect a first portion of light transmitted by the display. A light transmitting element B can allow a second portion of light transmitted by the display to reach the light receiver. The selective screen can increase the resolution of the display by operating at the predetermined frequency and causing a first portion of the first image to be shown at the first time, and a second portion of the second image to be shown at the second time, where the first portion of the first image and the second portion of the second image are different. The predetermined frequency enables the light receiver to form an image based on the first portion of the first image, and the second portion of the second image.

In another implementation, the disclosed system and method can modify luminance of a display. A processor can obtain an input image to present on the display, where the display is associated with a selective screen. The display is configured to provide a light receiver with an image having resolution higher than resolution of the display by presenting multiple images associated with the input image while the selective screen enables light from different portions of the multiple images to reach the light receiver, thereby causing the light receiver to form the image including the different portions of the multiple images. The resulting luminance of the image is lower than a combination of luminance values of the multiple images. The processor can obtain a criterion indicating a property of the input image where image detail is unnecessary. The processor can detect a region of the input image satisfying the criterion and determine a region of the selective screen corresponding to the region of the input image. The processor can increase the luminance of the display by disabling the region of the selective screen corresponding to the region of the input image, thereby decreasing resolution of a region of the display corresponding to the region of the input image.

In a third implementation, the disclosed system and method can increase resolution of a display in postprocessing. The processor can obtain multiple images presented on a display, where the display is configured to present the multiple images at a first frame rate higher than a frame rate needed to form a perception of motion. The processor can obtain a mask corresponding to one or more images among the multiple images, where the mask indicates a portion of the one or more images among the multiple images to include in an output image. The processor can increase resolution of the display in proportion to the number of multiple images presented to the display by combining, based on the mask, the one or more images among the multiple images to obtain the output image.

BRIEF DESCRIPTION OF THE DRAWINGS

Detailed descriptions of implementations of the present invention will be described and explained through the use of the accompanying drawings.

Figure 1:
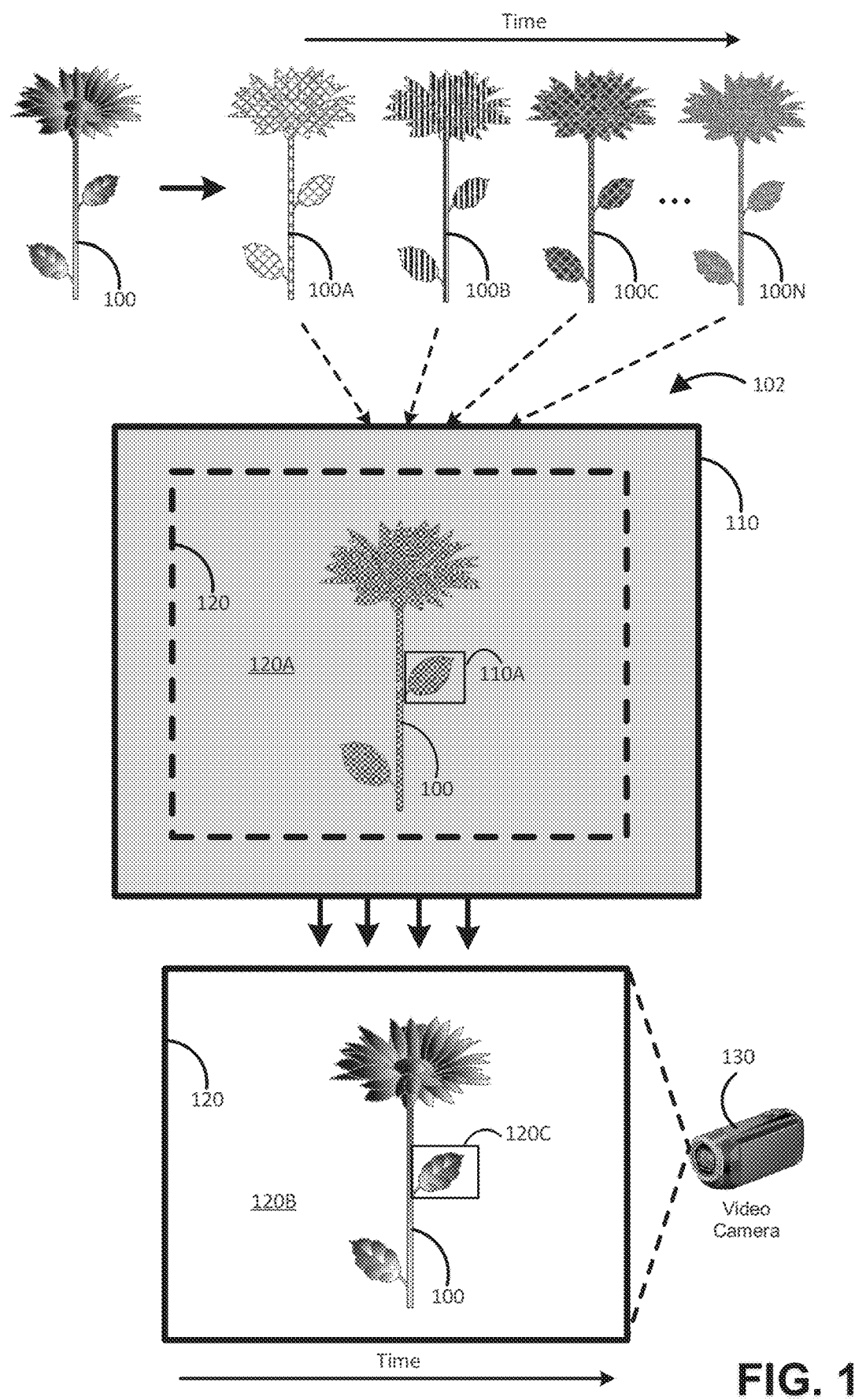
FIG. 1 illustrates an image represented by a set of pixels which define minute areas of illumination on a display screen.

The technologies described herein will become more apparent to those skilled in the art from studying the Detailed Description in conjunction with the drawings.

Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Implementations provide a method and apparatus configured to display an output image from a display screen (e.g., monitor, television, LED wall, etc.) with a higher resolution image than the display screen is designed to natively produce (4K versus 2K resolution).

In one implementation, a display screen which may consist of multiple light sources, such as light emitting diodes (LEDs), may be configured to display a series of different lower resolution images configured to form, when combined, a high-resolution ("high-res") image. The lower resolution images may be displayed in some predefined order using specified locations or sections on the display screen which correlate to sections of the high-resolution image. Displaying the lower resolution images within a period of time, such as a time duration of a frame of a video sequence, in the predefined order, fills in image details within the sections of the high-resolution image being recorded, eventually forming the high-resolution image.

To generate an image that is N times the resolution, a display may be divided into N sections. N can be any integer greater than 1. Each section of the display is used to display a particular portion of the image. The display receives a set of N number of predefined images of the image, which are then divided into multiple images. At least some of the multiple images associated with each section of the display are slightly different from each other in detail. The multiple images may be displayed in a predefined order, such as a sequential order, in a respective section of the display relative to their associated portion of the image within a specified time, such as the duration of a frame, to generate the image.

In some implementations, in order to display a higher resolution image from a lower resolution image, a portion of one or more LEDs which form a pixel are reused over two or more video sequences to build image detail to form the image.

For example, in response to a first video signal associated with a first image, at a first time, the color of an LED (e.g., red) used may be set to the first color. A high-res selective screen with a pixel opening corresponding to a first pixel of a high-res image may be placed in front of the LED to block light from all but a portion of the LED. The portion of the LED not blocked provides a first pixel of the high-res image at a first location with the first color. The resolution of the selective screen can be the same as the resolution of the high-res image.

At a second time, the color of the LED may be set to a second color (e.g., green) in response to a second video sequence. The high-res selective screen may be placed in front of the LED image to block all but a second portion of the LED, forming a second pixel of the high-res image.

Thus, in this implementation, the multiple low-res images which are associated with one or more sections and pixels of the high-res selective screen are employed to sequentially add detail to an image recorded by a light receiver.

Implementation Pertaining to Illumination

While illuminating an N number of sections of the display in some order will reduce the amount of display brightness generally by a factor of N, some implementations described herein may be used to offset the reduction of brightness. For example, larger LEDs may be used that are inherently brighter than the LEDs used for higher resolution displays such that the brightness of a lower resolution LED display may be configured with a brightness that is equal to or greater than the target display resolution.

In an illustration, a display of a certain fixed dimension with one-fourth the resolution may have LEDs that are four times larger and thus four times brighter than an LED display of the same fixed dimension.

Implementation Pertaining to Trading Between Brightness and Detail

In some implementations, image detail versus a desired brightness may be used to determine for a particular low-res display screen whether to employ high-resolution processing as described herein, or whether to use a lower resolution image that is inherently brighter, such as the native resolution of the display screen.

For example, a view of a low detail background, such as a clear blue sky, may trigger a response to employ the native resolution of the display screen to display the blue sky portion of the display image instead of the high-resolution image because, as in this example, more detail would not be necessary to reproduce the blue sky background.

Mechanical Implementation—Moving Display Screen and/or Lenticular Lens

In other implementations, the selective screen and/or display screen may be vibrated, e.g., moved in two or more directions, such that only a set of portions of pixels of the display screen is visible at a particular physical position on the display screen. The selective screen and/or the display screen may be vibrated using actuators or other mechanical mechanisms as known in the art, such as mechanical actuators. The selective screen includes at least two portions, one that allows light to reach a light receiver, and one that redirects light. The portion that redirects light can block the light from reaching the light receiver, can direct light away from the light receiver, or can focus the incoming light to a portion of the light receiver.

In this implementation, the relative motion of the selective screen and the display screen causes alignment between regions of the display screen and the region of the selective screen allowing transmission of light from the display screen. When aligned with openings or light transports in the selective screen, only one or more pixels or portions of the display screen transmit light through the selective screen, while the remaining portion of the pixels' light transmission is blocked by the selective screen.

As the selective screen and/or the display screen is vibrated, a series of predefined images are displayed by the display at its native resolution in a particular order for each section over a predefined time period, to produce a higher resolution image than what is native for the display. In some implementations, the vibration or motion of the display is synchronized with displaying the low-res images through transmission sections of the selective screen to allow the sets of images to be projected though the selective screen in a particular order.

Displaying the predefined images in the particular order, approximately in sync with the relative motion between the selective screen and the display screen, allows one or more sections of the display to receive and display images over a time period that results in producing the desired level of detail for one or more portions of the image.

Thus, as the display screen and the selective screen move relative to each other, the predefined images that pass through the selective screen or other light emitting apparatus, when visually combined in the eyes of the viewer, produce a resulting image with one or more portions of the displayed image having a higher resolution than the native resolution of the display screen.

Implementation Pertaining to Using a Grid of Liquid Crystal Displays to Form the High-Res Display In some implementations, a set of liquid crystal displays (LCDs) are configured to form a high-res selective screen designed to be placed in front of a low-res display screen, such as an LED wall display.

Here, the LCDs of the high-res selective screen are sized and grouped at a resolution higher than the root resolution of the display. The resolution of the LCDs can match the desired resolution of the high-res image. For example, the LCD grid may be sized to display an image at 4K from a display screen configured to natively display the image at 2K.

In one configuration, the LCDs are configured such that they can be set to transmissive state or to opaque state. In the transmissive state, one or more LCDs allow a portion of light from a pixel of the low-res display screen to pass through the selective screen forming higher resolution individual higher-res pixels of the selective screen. In opaque state, one or more LCDs block or only partially allow the portion of light from a pixel of the low-res display screen to pass through the higher-res pixels of the selective screen. In other implementations, the LCDs may be configured to amplify the light they receive.

Here, the low-res display screen is provided a set of images derived from a high-res image where at least some of the set of images represent different higher-res pixels of the high-res image. When combined over a period of time, for example by image processing, the different higher-res pixels of the set of images provide image detail to form the high-res image. In one implementation, generating a high-res image from the set of images involves capturing a video sequence with a camera or other light receiver device.

For example, at a first video sequence time, the low-res display receives a first set of pixels representing a first image. The first image is displayed by the low-res display behind the selective screen. To display the hi-res version of the first image, a first set of pixels of LCD are set to either transmissive state or opaque state. The LCDs set to transmissive state display the first set of high-res pixels for the high-res image on the selective screen. The first set of LCDs set to opaque state fully or partially block the remaining light being displayed on the low-res display screen. The camera captures the first image of the first set of high-res pixels from the selective screen.

At a second video sequence time, the low-res display receives a second set of pixels representing a second image. The second image is displayed by the low-res display behind the selective screen. To display the hi-res version of the second image, a second set of pixels of the selective screen are set to either transmissive state or opaque state. The LCDs set to transmissive state display the second set of high-res pixels for the high-res image on the selective screen. The second set of LCDs set to opaque state fully or partially block the remaining light being displayed on the low-res display screen. The camera captures the second image of the second set of high-res pixels from the selective screen.

In this implementation, the process continues until at least a threshold number of the set of images have been presented via the selective screen in sequence and captured by the camera to form the resultant high-res image either in the camera and/or using image processing to generate the high-res image which has a greater resolution than the display screen can natively produce.

Implementation Pertaining to Switching High-Res Mode on or Off Relative to Camera View In some implementations, to further increase brightness from the selective screen, the system may turn off or adjust high-res mode on one or more sections of the selective screen that the camera is not imaging. For example, one or more sets of adjacent LCDs that are not in view of the camera may be set to transmissive state to allow more light from the underlying LED of the low-res display screen to show through.

In this scenario, hi-res LEDs of the light transport display not in view of the camera may be combined and employed to illuminate parts of the virtual production set. For example, one or more sets of the light transport display not in view of the camera may be used for set lighting, shadows, patterns, effects, etc.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Increasing Apparent Resolution of a Display Using a Selective Screen

FIG. 1 illustrates an image 100 represented by a set of pixels which define minute areas of illumination on a display screen ("display") 110. In one scenario, different groupings of the set of pixels are parsed into a set of images 100A-N that may contain different details pertaining to image 100. The different groupings of pixels contain at least some different details of image 100 that when combined produce image 100. For example, consider image 100. Image 100A may be composed of even pixel columns of image 100, and image 100B may be composed of odd pixel columns of image 100, such that when displayed or combined in an image processing system, generate image 100.

In some implementations, an image display system 102 includes display screen 110 at a first resolution, e.g., 2K pixels per inch (PPI), and a selective screen 120, having a second resolution which is typically at a higher resolution, e.g., 4K PPI, than the display screen 110. Display screen 110 may be virtually any type of display screen that generates images through illuminating a grid of pixels.

In digital imaging, a pixel, pel, or picture element is a smallest addressable element in a raster image, or the smallest addressable element in an all points addressable display device. A pixel is considered the smallest controllable element of a picture represented on the screen, such as display screen 110, selective screen 120, and the like, and may be generated using light sources such as light emitting diodes (LED) or lasers, may be formed from light projected onto a screen, or may be formed by other means such as reflective surfaces, holes, light tubes, and the like. For example, display screen 110 may be derived from a group of LEDs formed into an electronic display such as an LED wall, a television, a computer monitor, a projection screen, etc.

In one configuration, selective screen 120 is positioned proximate to display screen 110 in a manner to receive illumination from display screen 110 on one side of selective screen 120, portions of which are transmitted to an opposite side of selective screen 120 as described herein. For example, selective screen 120 may include a set of transmissive pixels configured to receive light from a light source, such as display screen 110, and transmit at least some wavelengths of the light source through the selective screen 120. In one configuration, the transmissive pixels may be formed using one or more grids of holes, apertures, slots, light tubes, and other types of structures, either active or passive, that may be used to transmit, repeat, and/or amplify at least some electromagnetic energy received on one side of selective screen 120, e.g., a light receiving side 120A, to another side of selective screen 120, e.g., a display side 120B.

In one display process, images 100A-N may be presented in a particular order on display screen 110. As images 100A-N are illuminated in the particular order on display screen 110 using the first resolution, selective screen 120 receives illumination of images 100A-N on receiving side 120A, processes images 100A-N, and then transmits at least some of the received illumination through selective screen 120, which is then employed to illuminate display side 120B at the second resolution. To form image 100, a light receiver 130 may capture images 100A-N in the particular order displayed on selective screen 120, which may then be combined, for example, through an image processing system to form image 100. The light receiver 130 can be an image receiving device, an image capture device, a camera, a video camera, a light receptor, an eye, etc. The light receiver 130 and the display 110 are synchronized in a manner causing the light receiver to perceive the images 100A-N as a single image.

Figure 2:
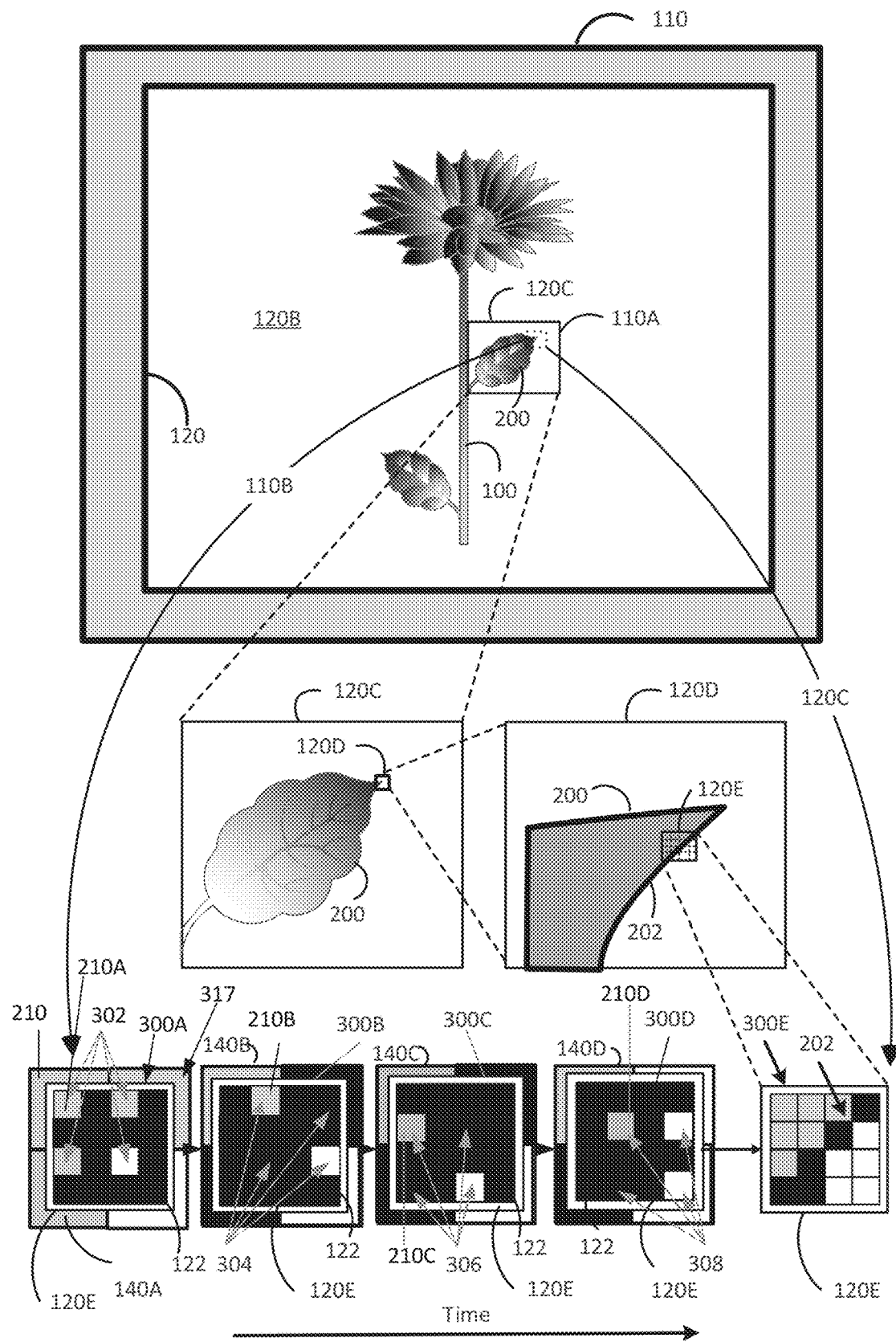
FIG. 2 illustrates a process for displaying, over a period of time, a series of images representing a leaf portion on a pixel section of a display screen, at a first pixel resolution, which is then displayed on a pixel section of a selective screen, at a second resolution.

FIG. 2 illustrates a process for displaying, over a period of time, a series of images 100A-N representing leaf portion 200 on a pixel section 110A of display screen 110, at a first pixel resolution, which is then displayed on a pixel section 120E of selective screen 120, at a second resolution. In one example process, selective screen 120 receives illumination from section 110A at a first pixel resolution via receiving side 120B, employs selective screen 120 to process at least some of the illumination received at a second pixel resolution, displays images 100A-N representing leaf portion 200 on display side 120C at the second pixel resolution, and then employs light receiver 130 over the time period to capture the series of images 100A-N at the second pixel resolution to form leaf portion 200.

In one example, portions of images 100A-N representing leaf portion 200 are displayed at a first resolution in a particular order, over time, such as a frame, using LEDs 140 representing pixels and/or subpixels of display screen 110. Here, LEDs 140 of section 110B of display screen 110, when activated, illuminate a pixel section of receiving side 120B of the selective screen 120. The Illumination of the receiving side 120B of selective screen 120 is then processed and transmitted through selective screen 120 to pixel display side 120C.

In some configurations, details of image 100 which are incapable of being displayed on display screen 110 due to its lower native resolution relative to the native resolution of image 100 are formed via combining images 100A-N displayed by selective screen 120. For example, to generate details of image 100 that are incapable of being displayed natively on display screen 110, in response to portions of images 100A-N being displayed on section 110B, light from pixels 140 at a first resolution, e.g., 2K, illuminates receiving side 120A of selective screen 120, and is then displayed via pixels 122 of selective screen 120. Pixels 140 can include LEDs, LCDs, OLEDs, or any other passive or active light transmitting element.

In one configuration, to display finer details from image 100, pixels 122 of the selective screen 120 may be configured to be smaller in size and correspond to the desired resolution of the high-res image. Pixels 122 may be positioned adjacent to pixels 140 in order to control the amount of light transmitted through selective screen 120. Because pixels 140 illuminate corresponding pixels 122, when pixels 140 change color over time in response to images 100A-N, pixels 122, configured to transmit light and/or direct at least some of the illumination, also change color.

In this example, at least some of pixels 122 may be positioned and/or controlled relative to adjacent pixels 140 to either transmit, partially transmit, redirect, or block light from such adjacent pixels 140 (e.g., pixels 140 that pixels 122 can receive illumination from). Since pixels 122 may be smaller than pixels 140, and are configured to allow only a desired portion of light to be transmitted and/or processed from pixels 140 through selective screen 120, finer details of image 100 may be displayed via pixels 122.

For example, to form an edge 202 of leaf portion 200, pixel configurations 300A-D representing leaf portion 200 may be displayed on section 110B of display screen 110 via LEDs 140. Section 110B of display screen 110 illuminates section 120D and 120E, which contains leaf edge 202. In response, pixels 122 of section 120E are configured to allow or block a portion of light from one or more pixels 140 that change to form pixel configurations 300A-D corresponding to at least some finer details of image 100 than displayed by display screen 110.

Here, at a first time, image 140A is displayed which illuminates LED pixels 140 of display screen 110. At least some pixels 122 of section 120E, here pixels 302, allow transmission of light from underlying pixels 140A, while other pixels 122 of section 120E block light from LEDs 140, forming pixel configuration 300A, corresponding to at least some finer details of image 100 than displayed by display screen 110. Light receiver 130 is then employed to capture the image created by pixel configuration 300A.

As can be seen in FIG. 2, colors of the pixels 302 of the selective screen 120 correspond to the colors of underlying pixels 140A-140D. Pixels 120E of the selective screen are shown as covering a smaller area than the pixels 140 of the underlying LED display for illustration purposes. In reality, pixels 120E of the selective screen overlap the underlying pixels 140 of the LED display.

At a second time, image 140B is displayed which illuminates LED pixels 140 of the display screen 110. In this example, pixels 304 of section 120E are configured to allow transmission of light from underlying pixels 140B, while other pixels 122 of section 120E block light, which forms pixel configuration 300B corresponding to at least some finer details of image 100 than displayed by display screen 110. Light receiver 130 is then employed to capture the image created by pixel configuration 300B.

At a third time, image 140C is displayed which illuminates LED pixels 140 of the display screen 110.

In this example, pixels 306 of section 120E are configured to allow transmission of light from underlying pixels 140C, while other pixels 122 of section 120E block light, which forms pixel configuration 300C corresponding to at least some finer details of image 100 than displayed by display screen 110. Light receiver 130 is then employed to capture the image created by pixel configuration 300C.

At a fourth time, image 140D is displayed which illuminates LED pixels 140 of the display screen 110. In this example, pixels 308 of section 120E are configured to allow transmission of light from underlying pixels 140D, while other pixels 122 of section 120E block light, which forms pixel configuration 300D corresponding to at least some finer details of image 100 than displayed by display screen 110. Light receiver 130 is then employed to capture the image created by pixel configuration 300D.

In this example, images captured of pixel configurations 300A-D are then combined to form image 300E, a portion of the image 100. To combine the pixel configurations 300A-D, the light receiver 130 can be synchronized to the display screen 110 and the selective screen 120 so that the light receiver 130 continuously records, e.g., keeps the shutter open, while the display screen 110 and the selective screen 120 display the full set of images needed to create the high-res, e.g., super resolution, image.

In the example of FIG. 2, the resulting super resolution image has four times the resolution of the underlying display screen 110 because each pixel 210 (only one labeled for brevity) on the display screen 110 is subdivided into pixels 210A, 210B, 210C, 210D (only four labeled for brevity) on the selective screen 120. The display screen 110 and the selective screen 120 are synchronized so that when the display screen 110 is showing image 140A, the selective screen 120 allows light through pixels 302 to pass. When the display screen 110 is showing image 140B, the selective screen 120 allows light through pixels 304 to pass. When the display screen 110 is showing image 140C, the selective screen 120 allows light through pixels 306 to pass, and when the display screen 110 is showing image 140D, the selective screen 120 allows light through pixels 308 to pass. The light receiver 130 is synchronized to the display screen 110 and the selective screen 120 to continuously record while the display screen and the selective screen cycle through displaying pixel configurations 300A-D. Once all four images are displayed, the light receiver 130 closes the shutter, and records the image containing light from all the pixel configurations 300A-D, to obtain the final image 300E.

FIGS. 3A-3D illustrate a mechanical version for processing illumination from a display screen 110 via a selective screen 120. Here, pixels 122 of a selective screen are positioned relative to pixels, e.g., LEDs 140, of display screen 110 such that certain portions of pixels of display screen 110 are either blocked or can transmit illumination through selective screen 120.

Figure 3A:
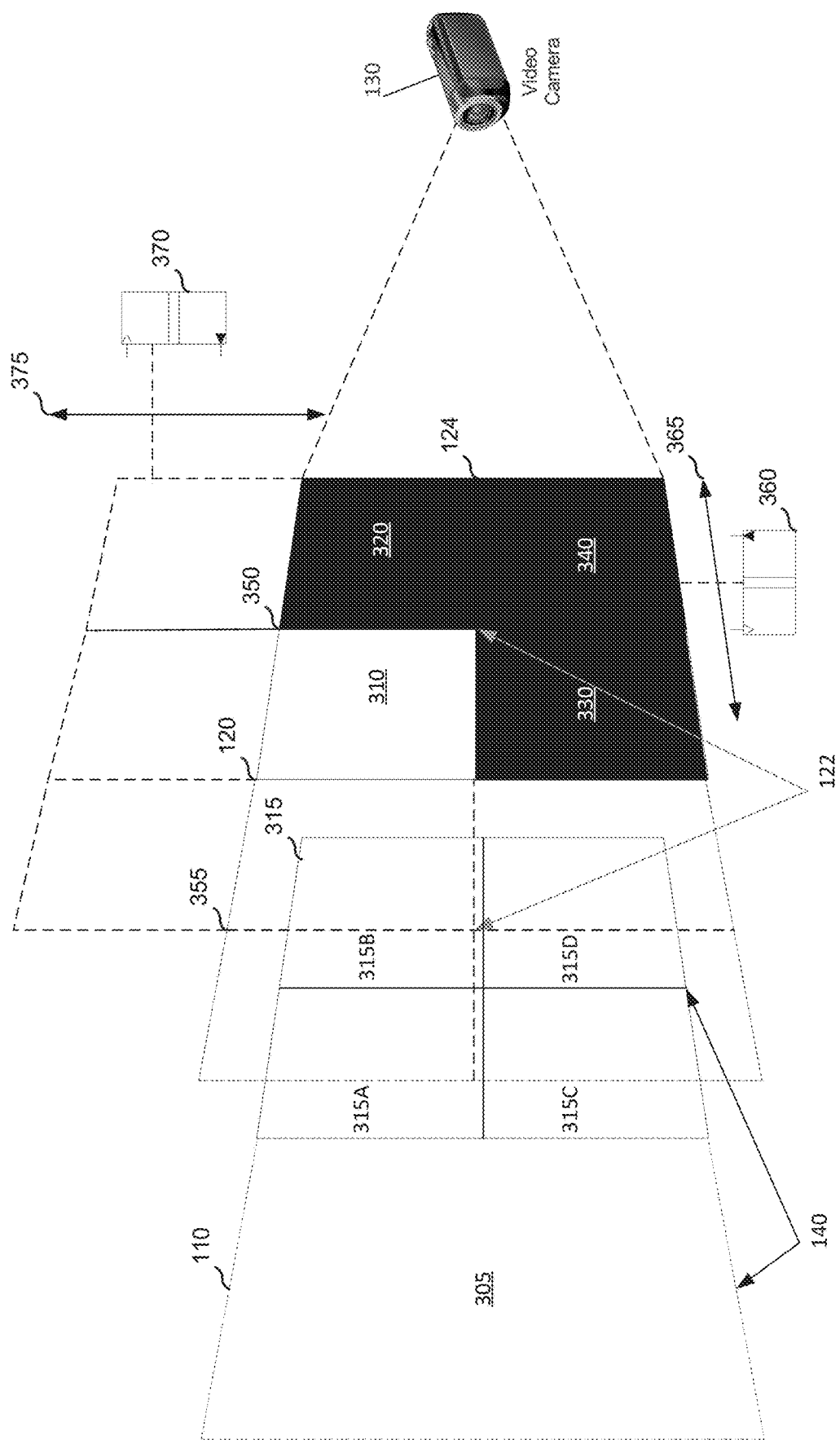
FIGS. 3A-3D illustrate a mechanical version for processing illumination from a display screen via a selective screen.

Pixel 315 is a pixel on the display screen 110. In FIG. 3A, pixels 310, 320, 330, 340 are pixels on the selective screen 120 placed in front of the pixel 315. Pixels 310, 320, 330, 340 cover portions 315A, 315B, 315C, 315D of the pixel 315, respectively. Pixel 310 controls whether the camera 130 records the illumination from the upper-left portion 315A of pixel 315. Pixel 320 controls whether the camera 130 records the illumination from the upper-right portion 315B of pixel 315. Pixel 330 controls whether the camera 130 records the illumination from the lower-left portion 315C of pixel 315. Pixel 340 controls whether the camera 130 records the illumination from the lower-right portion 315D of pixel 315. If all pixels 310, 320, 330, 340 were to transmit light, the full illumination of pixel 315 would pass through to the camera 130.

Pixel 310 can be configured to transmit light, and can be an aperture, such as a hole. When pixel 310 is positioned in front of different portions of the underlying pixel 315, as shown in FIGS. 3A-3D, different portions of the underlying pixel 310 are visible to the light receiver 130.

In this example, the selective screen 120 may contain an illumination blocking or redirecting structure 124 which is designed to separate pixels according to a pixel configuration of display screen 110. In one implementation, the blocking structure 124 can include pixels 320, 330, 340, and can cover three-quarters of the surface area of pixel 315. Pixel blocking structures 124 can be positioned in front of every pixel 315, 305 on the display screen 110. Consequently, blocking structures 124 can allow only a portion of the illumination from pixels 140, including pixel 315, to reach the camera 130. The blocking structure 124 and the pixel 310 form a portion 350 of the selective screen 120.

The blocking structure 124 can be an opaque material. The portion 350 of the selective screen 120 including the blocking structure 124 can be electrochromic, so that the opacity of the blocking structure 124 changes when voltage is applied to it. In one configuration, to allow light to pass through pixel 320, and block pixel 310, voltage can be applied to the blocking structure, so that the pixel 320 becomes transparent, while the pixels 310, 330, and 340 remain opaque.

The portion 350 of the selective screen 120 including the blocking structure 124 can be a digital micromirror device. The digital micromirror device is a microscopically small mirror that can be laid out in a matrix on a semiconductor chip. These mirrors can be 5.4 µm or less in size. Each mirror represents one or more pixels in the projected image. The number of mirrors corresponds to the resolution of the projected image. The mirror can be repositioned rapidly to reflect light either through the lens or onto a heat sink. The light that is reflected through the lens can reach the light receiver 130, while the light reflected into the heatsink does not reach the light receiver. Rapidly toggling the mirror between these two orientations (essentially on and off) produces grayscales, controlled by the ratio of on-time to off-time.

Figure 5A:
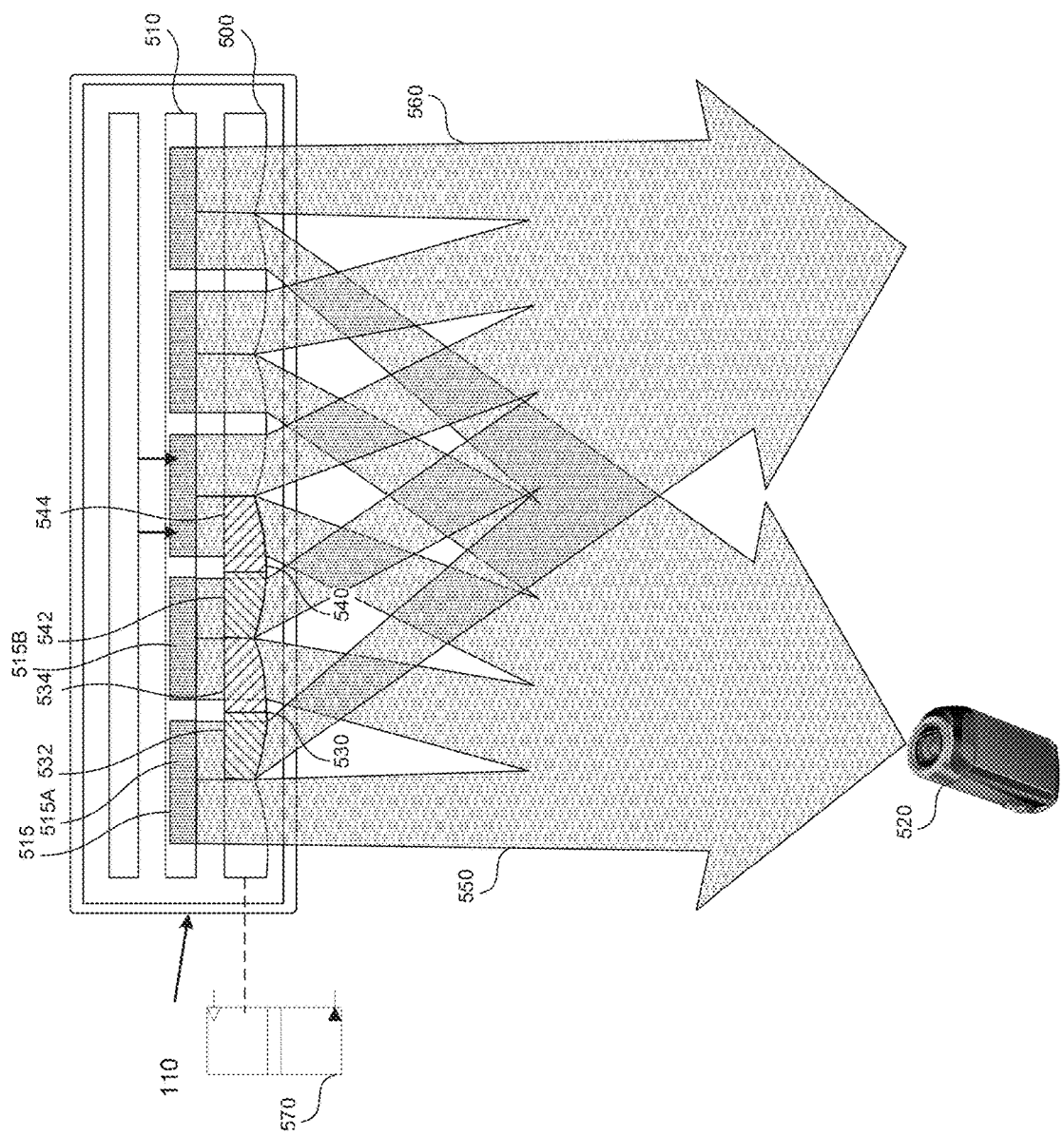
FIGS. 5A-5B show a top view of a display and a micro lens array configured to selectively allow light to reach a light receiver.

A mirror among the multiple mirrors can correspond to the first light transmitting element among multiple light transmitting elements 510 in FIG. 5A. The mirror can be configured to be arranged in a first position and a second position, where the first position of the mirror is configured to guide the first portion of light transmitted by the first light transmitting element toward the second portion of light transmitted by the first light transmitting element. The first position of the mirror corresponds to the second light transmitting element that redirects the incoming light. The second position of the mirror is configured to allow the second portion of light transmitted by the first light transmitting element among the multiple light transmitting element 510 to reach the light receiver. The second position of the mirror corresponds to the third light transmitting element that allows incoming light to reach the light receiver.

In another configuration, selective screen 120 and/or display screen 110 are moved via mechanical actuators and the like such that pixels 122 of the selective screen 120 and pixels 140 of the display screen 110 are positioned relative to each other to allow a predefined portion of illumination of LEDs 140 to pass through while blocking most, if not all, of the remaining illumination from LEDs 140. For example, at least some pixels 122 may provide a subpixel level of detail for LEDs 140.

Mechanical actuators 360, 370 can move portion 350 of the selective screen in horizontal direction 365 and vertical direction 375, thus enabling the pixel 310 to align with various portions 315A, 315B, 315C, 315D of the pixel 315 and allowing light from the various portions of the pixel to reach the light receiver 130. As can be seen in FIGS. 3A-3D, as the portion 350 of the selective screen 120 moves in the horizontal direction 365 and in the vertical direction 375, four different areas of the underlying pixel 315 are exposed. When the camera 130 records the four images, the resulting image 300E in FIG. 2 is produced.

In one implementation, the mechanical actuators 360, 370 can move only the portion 350, covering the single pixel 315. In another implementation, the mechanical actuators 360, 370 can move multiple portions 350, 355 of the selective screen 120 at the same time. Pixel 315 can correspond to pixel 317 in FIG. 2.

For example, at a first time shown in FIG. 3A, selective screen 120 and display screen 110 may be positioned relative to each other such that LEDs 140, when illuminated to display image 100A in FIG. 1, cause pixels 122 receiving the illumination to form an illuminated pixel configuration corresponding to pixel configuration 300A in FIG. 2. In this case, pixel 310 allows light from pixel 315A to pass, while pixels 320, 330, 340 block the light from pixels 315B, 315C, 315D, respectively. Light receiver 130 is then employed to capture the image created by pixel configuration 300A.

Figure 3B:
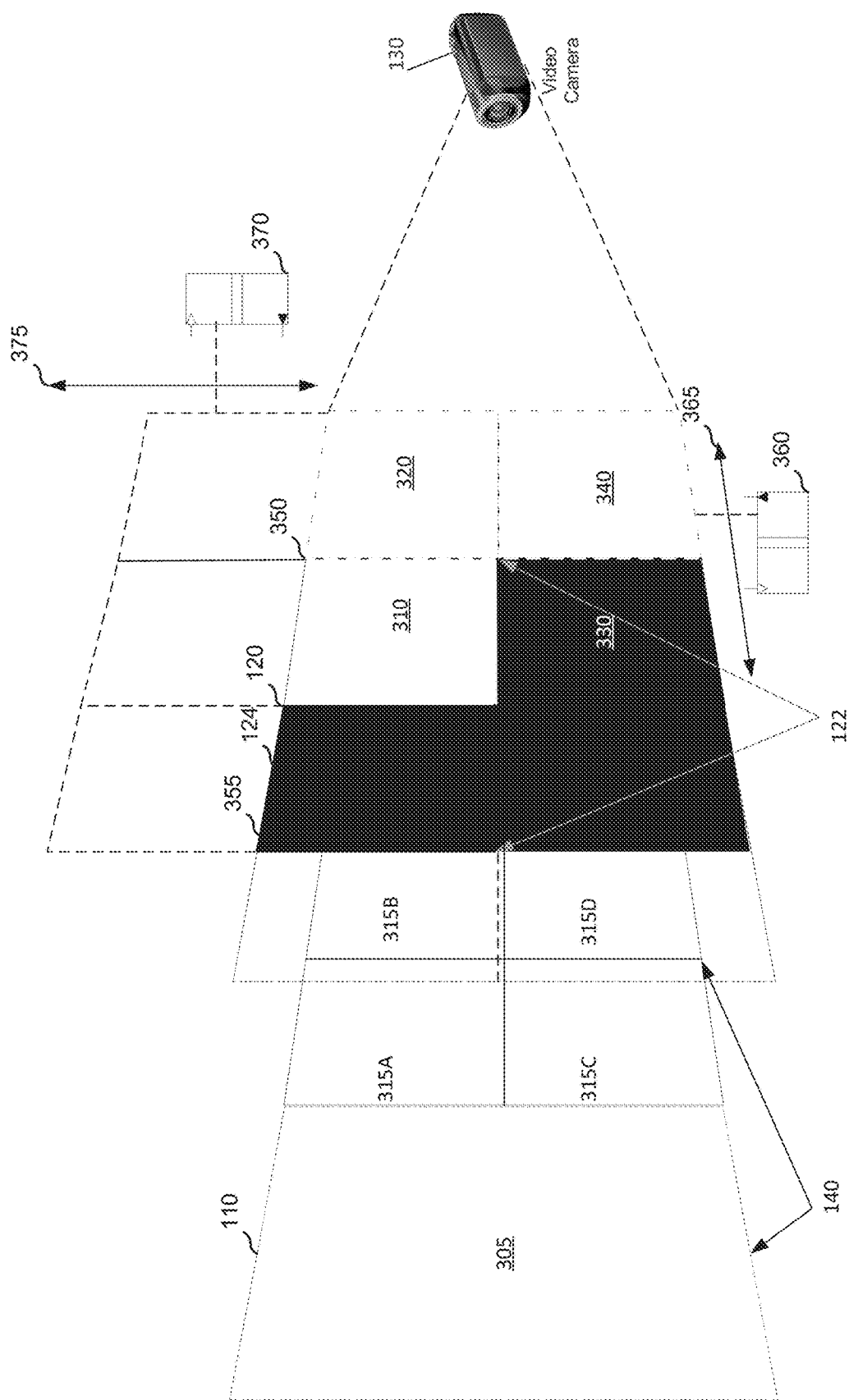

At a second time shown in FIG. 3B, selective screen 120 can be moved horizontally to the right to a second position such that LEDs 140, when illuminated to display image 100B in FIG. 1, cause pixels 122 receiving the illumination to form an illuminated pixel configuration corresponding to pixel configuration 300B in FIG. 2. In this case, pixel 310 allows light from pixel 315B to pass, while pixel 330 blocks the light from pixel 315D. Pixels 320, 340 block the light from a neighboring pixel 315 on the display screen 110. Light receiver 130 is then employed to capture the image created by pixel configuration 300B.

Figure 3C:
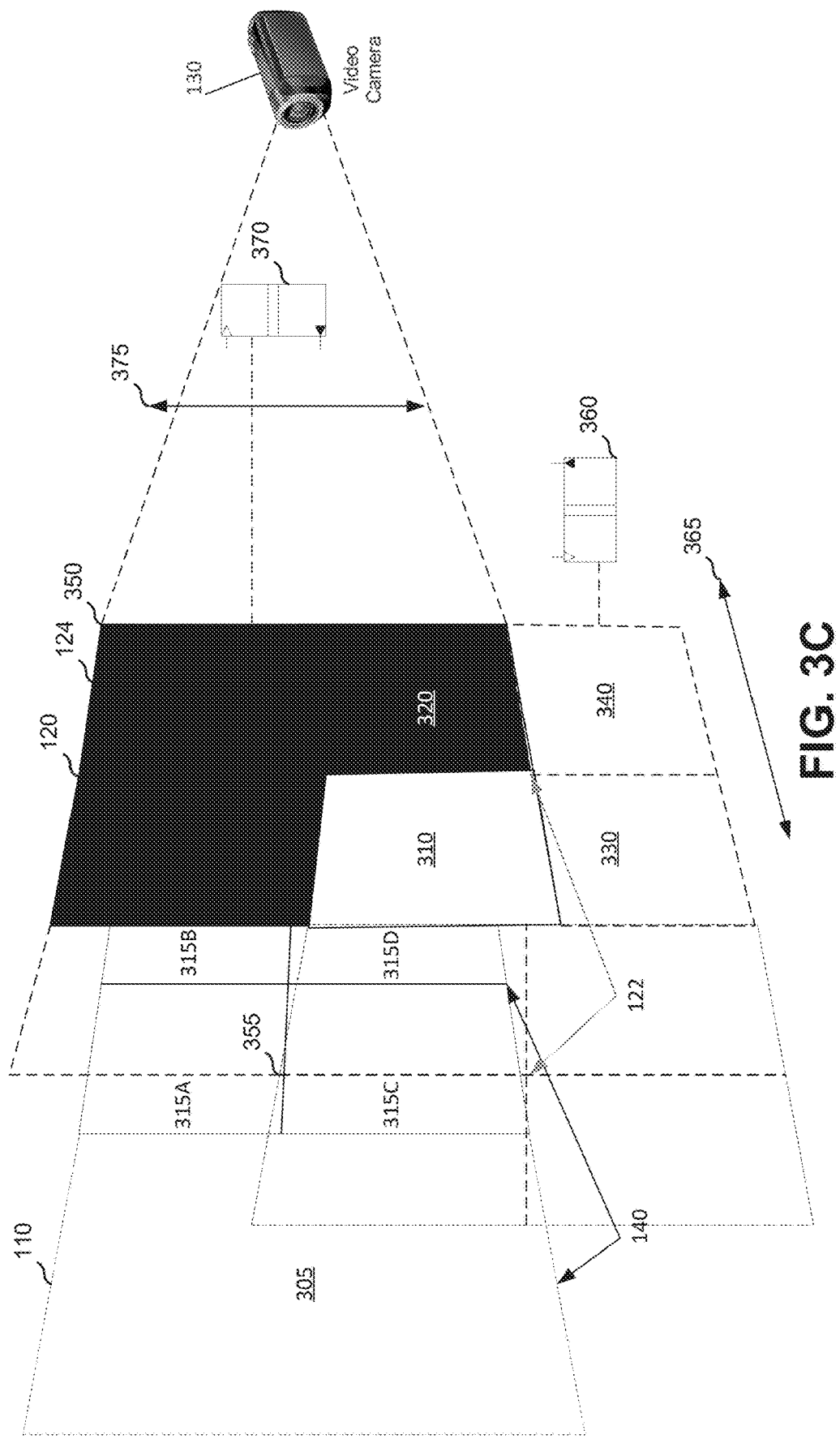

At a third time shown in FIG. 3C, selective screen 120 can be moved down to a third position such that LEDs 140, when illuminated to display image 100C in FIG. 1, cause pixels 122 receiving the illumination to form an illuminated pixel configuration corresponding to pixel configuration 300C in FIG. 2. In this case, pixel 310 allows light from pixel 315C to pass, while pixel 320 blocks the light from pixel 315D. Pixels 330, 340 block the light from a neighboring pixel 315 on the display screen 110. Light receiver 130 is then employed to capture the image created by pixel configuration 300C.

Figure 3D:
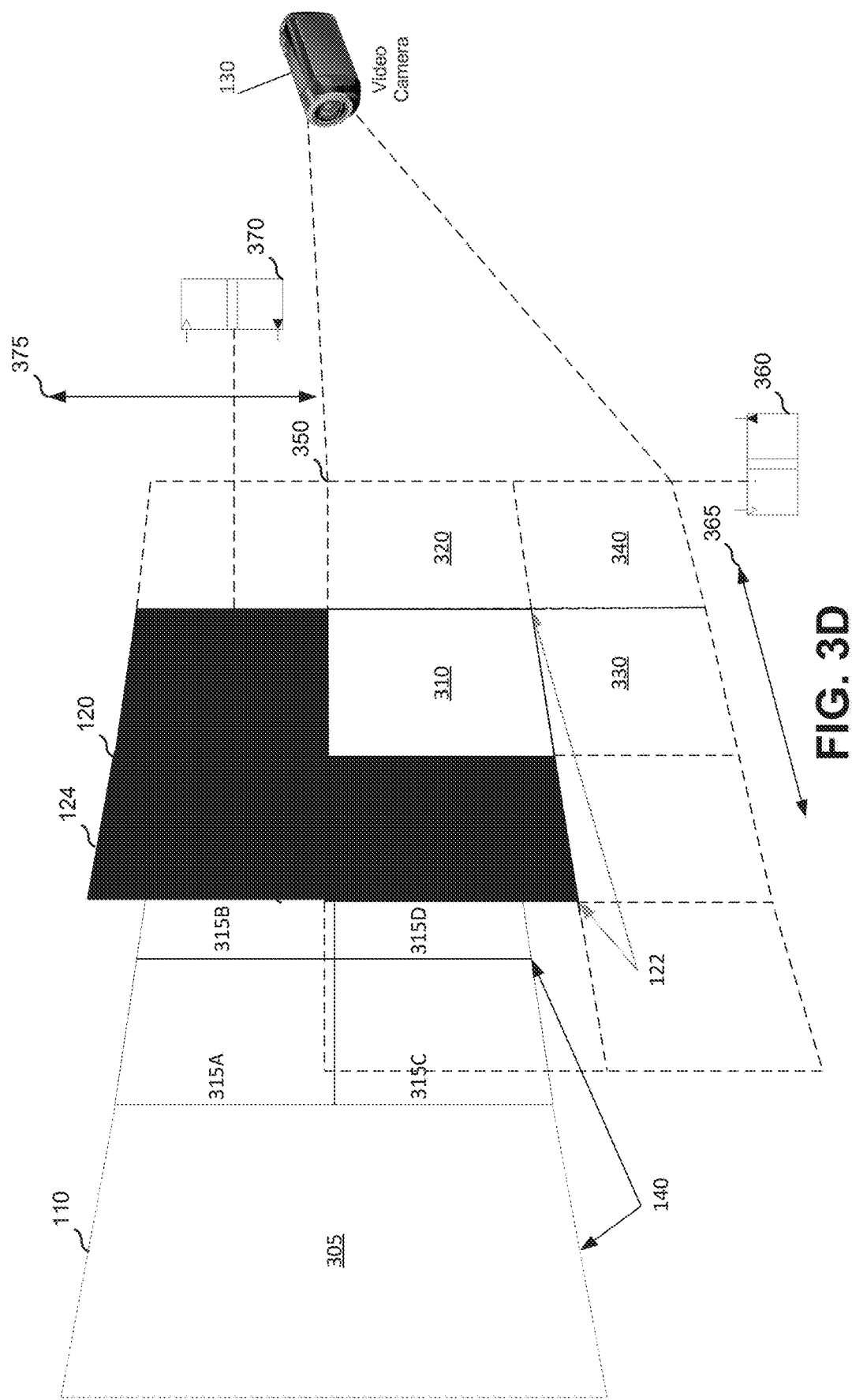

At a fourth time shown in FIG. 3D, selective screen 120 can be moved down and to the right to a fourth position such that LEDs 140, when illuminated to display image 100D (not pictured in FIG. 1), cause pixels 122 receiving the illumination to form an illuminated pixel configuration corresponding to pixel configuration 300D in FIG. 2. In this case, pixel 310 allows light from pixel 315D to pass. Pixels 320, 330, 340 block the light from a neighboring pixel 315 on the display screen 110. Light receiver 130 is then employed to capture the image created by pixel configuration 300D.

In this example, as described herein, images captured of pixel configurations 300A-D may then be combined to form image 100, e.g., edge 202 of leaf portion 200, displaying details which could not be displayed by display screen 110 at its native resolution.

Figure 4:
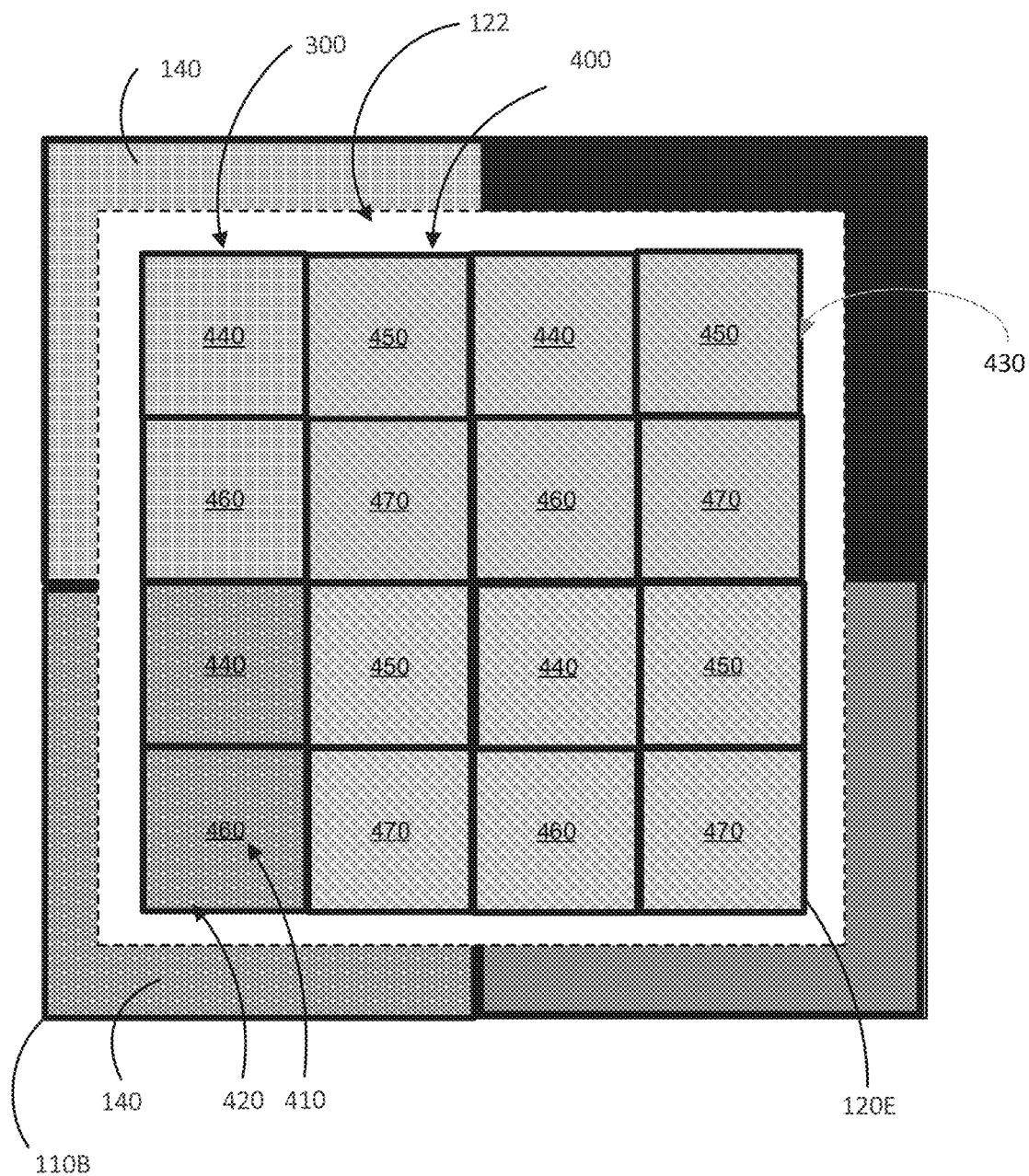
FIG. 4 illustrates a section of a display screen and LEDs disposed behind a section of a selective screen.

FIG. 4 illustrates section 1108 of display screen 110 and LEDs 140 disposed behind section 120E of selective screen 120. In this configuration, display screen 110 and/or selective screen 120 may or may not be moved, but rather may be configured as an electronic mask that may be employed to control what illumination is displayed from LEDs 140 on display side 1208 of selective screen 120.

For illustration purposes, section 1108 is shown larger in area than section 120E, while in reality the area of the section 1108 and the area of the section 120E are the same. In FIG. 4, each pixel in section 1108 corresponds to four pixels in section 120E, however, other correspondences are possible such as each pixel in section 1108 corresponds to 2, 3, 4, 5, etc., pixels in section 120E. Here, pixels 122 may be formed from one or more selective screen sections 400. Selective screen sections 400 may be formed from any structure such as a liquid crystal display, or an electrochromic material, designed to control the amount of illumination passing therethrough.

For example, referring to FIG. 2, section 120E may include selective screen sections 400. The selective screen section can contain multiple regions. The region can be a pixel 410, or a group of pixels. The group of pixels can be one or more columns 420, one or more rows 430, or a noncontiguous group of pixels 440. Each group of pixels can have a unique address, and can be controlled independently of the other groups of pixels.

For example, to obtain the illumination pattern described in pixel configurations 300A-300D in FIG. 2, the display screen 110 can be separated into four noncontiguous groups of pixels 440, 450, 460, 470. Pixels belonging to group 440 can be the upper-left corner pixels, pixels belonging to group 450 can be the upper-right corner pixels, pixels belonging to group 460 can be the lower-left corner pixels, while pixels belonging to group 470 can be the lower-right corner pixels. In pixel configuration 300A in FIG. 2, group 440 can allow the light to pass, while groups 450, 460, 470 block the light. In pixel configuration 300B in FIG. 2, group 450 can allow the light to pass, while groups 440, 460, 470 block the light. In pixel configuration 300C in FIG. 2, group 460 can allow the light to pass, while groups 440, 450, 470 block the light. In pixel configuration 300D in FIG. 2, group 470 can allow the light to pass, while groups 440, 450, 460 block the light.

As shown in FIG. 4, column 420 forms a group of pixels that is independently controlled from the rest of the pixels on the selective screen 120. As can be seen in FIG. 4, column 420 allows light from underlying pixels on the display screen 110 to pass, while the rest of the columns block the light from the underlying pixels on the display screen 110.

Figure 5B:
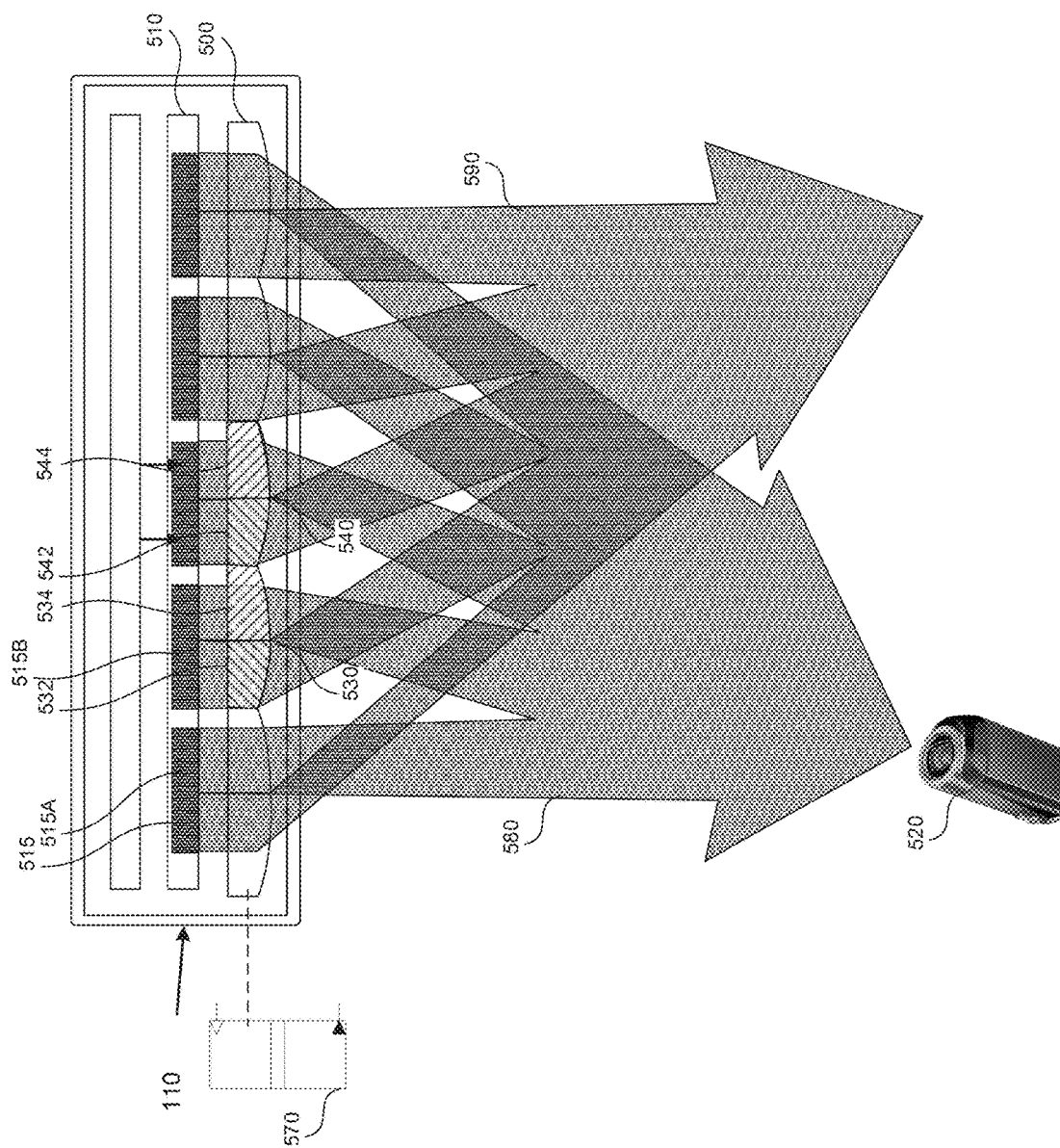

FIGS. 5A-5B show a top view of a display and a micro lens array configured to selectively allow light to reach a light receiver. The micro lens array 500 can be disposed between the light transmitting elements 510 of the display screen 110 in FIG. 1, and a light receiver 520. The light receiver 520 can be the light receiver 130, such as a camera, or a person's eye. The light transmitting elements 510 can be passive or active light transmitting elements. Passive light transmitting elements can be liquid crystals in a liquid crystal display, or digital micromirror devices. Active light transmitting elements can be light emitting diodes, organic light emitting diodes (OLEDs), etc.

The micro lens array 500 can include multiple lenses 530, 540 (only two labeled for brevity). The lens 530, 540 can correspond to a single light transmitting element 515 among the multiple light transmitting elements 510, or the lens can correspond to a column or a row of light transmitting elements. Each lens 530, 540 can include two portions 532, 534 and 542, 544, respectively.

In FIG. 5A, portion 532, 542 is aligned with the first portion 515A of the first light transmitting element. The portion 532, 542 directs the light away from the light receiver 520, thus preventing a portion 560 of light transmitted by the first light transmitting element from reaching the light receiver 520. The portion 534, 544 is aligned with the second portion 515B of the first light transmitting element. The portion 534, 544 directs the light toward the light receiver 520, thus allowing a portion 550 of light transmitted by the light transmitting elements 510 to reach the light receiver 520. Consequently, the light receiver 520 forms an image including light 550, but not light 560.

One or more actuators 570 can move the micro lens array 500 vertically or horizontally. As seen in FIG. 5B, the micro lens array 500 has been moved horizontally by half the width of the single light transmitting element 515. Once the micro lens array 500 has been moved, portion 534, 544 is aligned with the first portion 515A of the first light transmitting element. Portion 534, 544 directs the light toward the light receiver 520, thus allowing a portion 580 of light transmitted by the light transmitting elements 510 to reach the light receiver 520. The portion 532, 542 is aligned with the second portion 515B of the first light transmitting element. Portion 532, 542 directs the light away from the light receiver 520, thus preventing a portion 590 of light transmitted by the first light transmitting element from reaching the light receiver 520. Consequently, the light receiver 520 forms an image including light 580, but not light 590. As can be seen, different portions of the light transmitting element 515 are visible to the light receiver 520 in FIGS. 5A and 5B.

The image as presented on the display 110 in FIG. 5A can be different from the image presented in FIG. 5B. The light receiver 520 can keep the shutter open for the duration of the display of both images in FIGS. 5A and 5B. Consequently, the light receiver 520 can form a resulting image including a portion of both images in FIGS. 5A and 5B. The resulting image has a higher resolution than the resolution of the display 110.

Figure 6A:
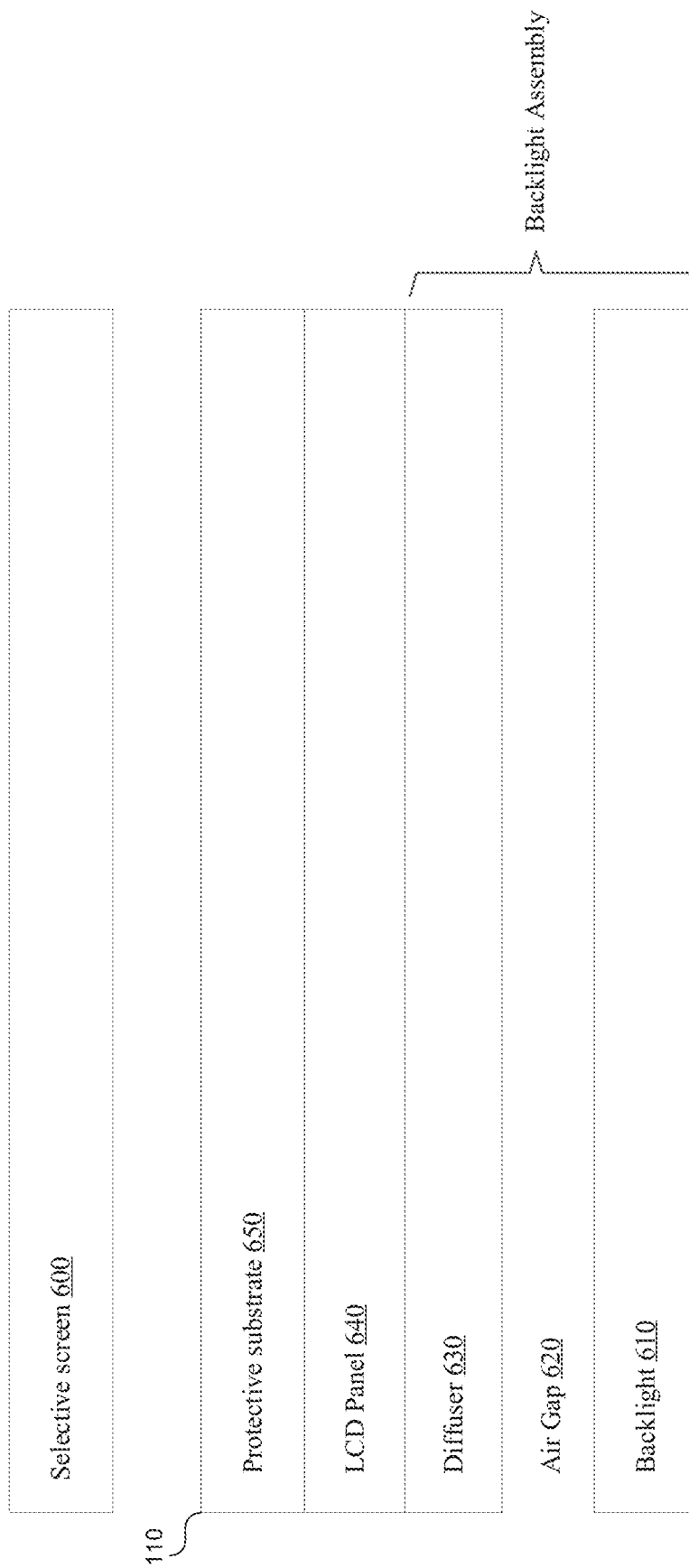
FIGS. 6A-6B show a position of a selective screen in a display stack.
Figure 6B:
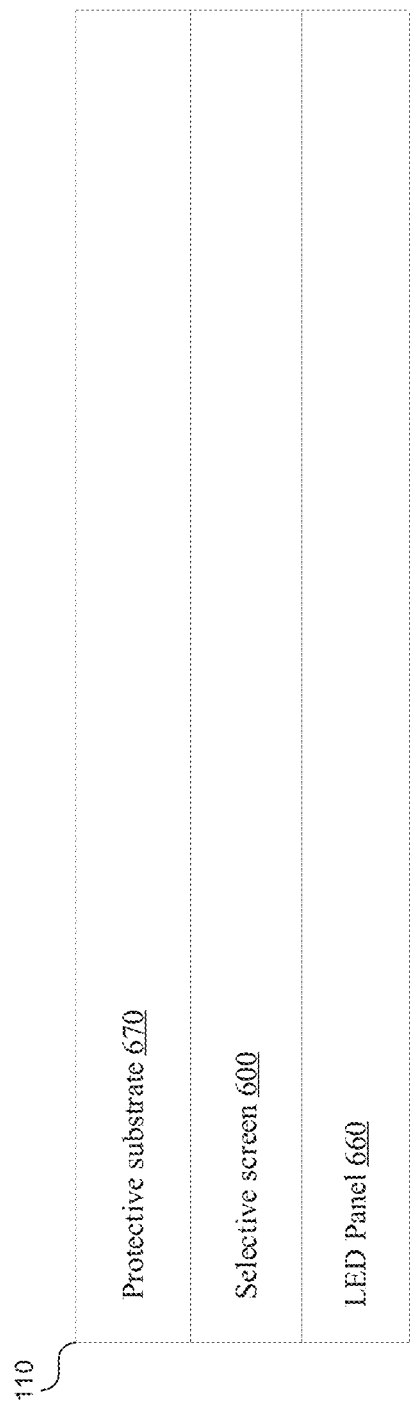

FIGS. 6A-6B show a position of a selective screen in a display stack. The selective screen 600 can be external to the display 110 stack as seen in FIG. 6A, or can be internal as seen in FIG. 6B. The display 110 stack can include various layers depending on the type of the display. If the display 110 is an LCD display, the display 110 stack can include backlight 610, an air gap 620, a diffuser 630, an LCD panel 640, and a protective substrate 650. The selective screen 600 can be placed outside of the display 110. If the display is an LED display, the display 110 stack can include the LED panel 660, the selective screen 600 integrated into the display 110 stack, and the protective substrate 670.

Increasing Luminance of a Time Multiplexed Super Resolution Display

Figure 7:
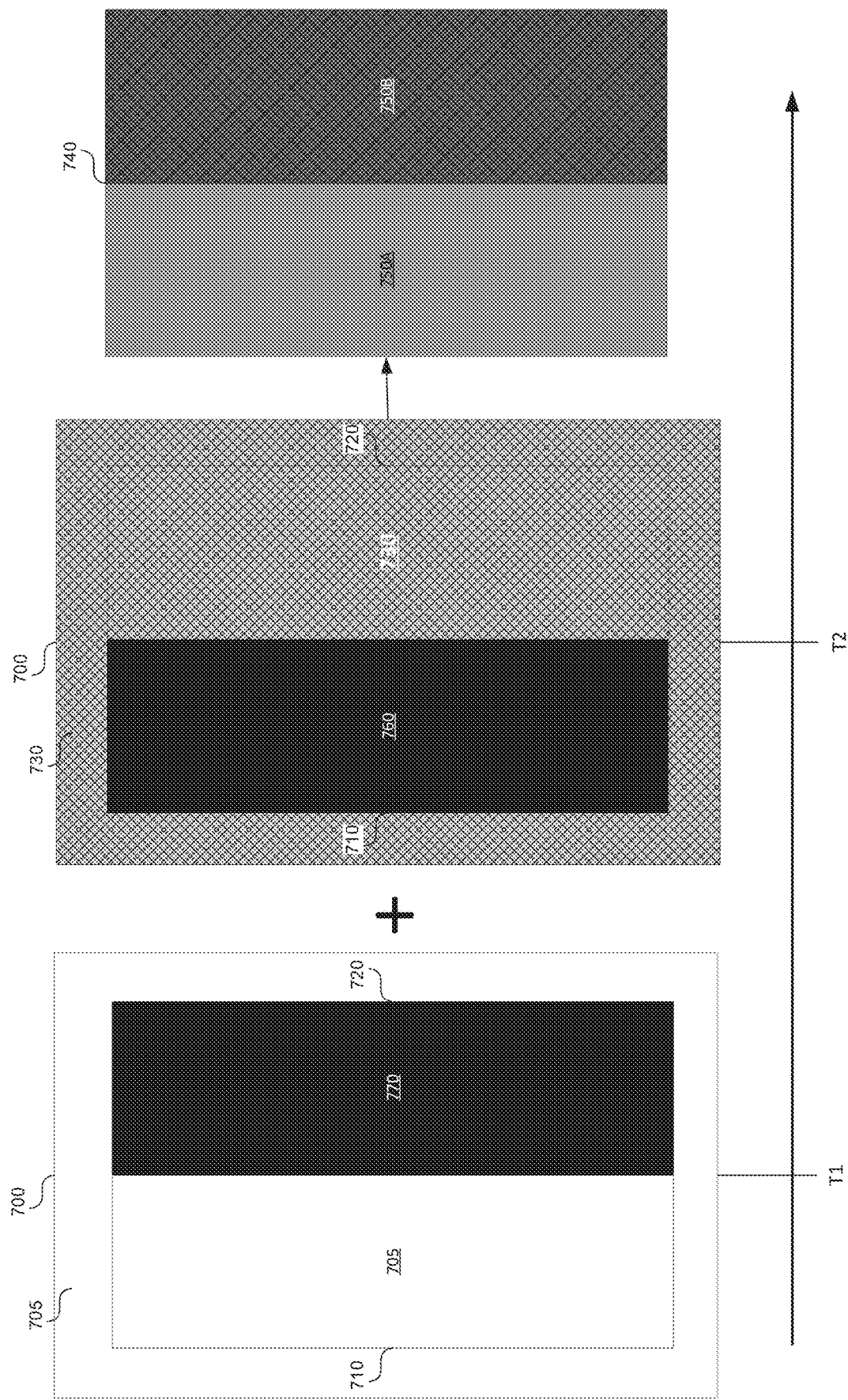
FIG. 7 shows a darkening of an image recorded by a light receiver.

FIG. 7 shows a darkening of an image recorded by a light receiver. Light transmitting element 700 at time T1 transmits illumination 705. The selective screen element 710 allows only a portion of the illumination 705 to reach a light receiver. The selective screen element 720 blocks a portion of the illumination 705 from reaching the light receiver. The combination of selective screen elements 710, 720 is drawn smaller than the light transmitting element 700 for illustration purposes only. Light transmitting element 700 at time T2 transmits illumination 730. At time T2, the selective screen element 710 does not allow a portion of the illumination 730 to reach the light receiver, while the selective screen element 720 allows a portion of the illumination 730 to reach the light receiver.

Light receiver element 740 is configured to record both the light transmitting element 700 at time T1 and the light transmitting element 700 at time T2 to record the illumination 750A, 750B. Because the light receiver element 740 is recording the sum of illumination at both time T1 and time T2, the recorded illumination 750A, 750B is darker than the illumination 705 and illumination 730, respectively. Specifically, illumination 750A is the sum of illumination 705 and 760, but illumination 750B is the sum of illumination 770 and 730. Consequently, in some cases, the disclosed system needs to increase the brightness of the display screen 110.

Figure 8A:
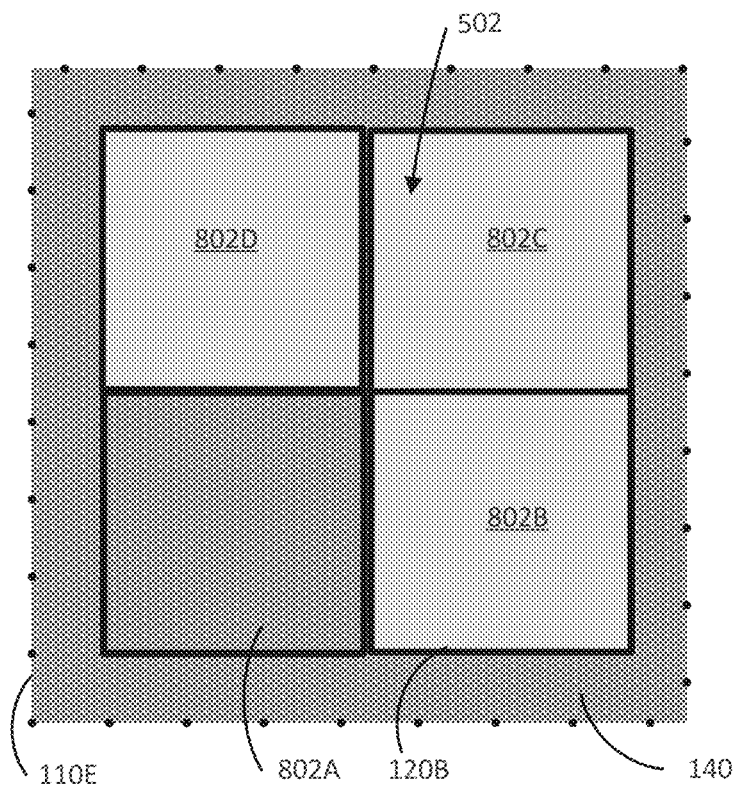
FIGS. 8A-8C show a light conductor according to various implementations.
Figure 8A:
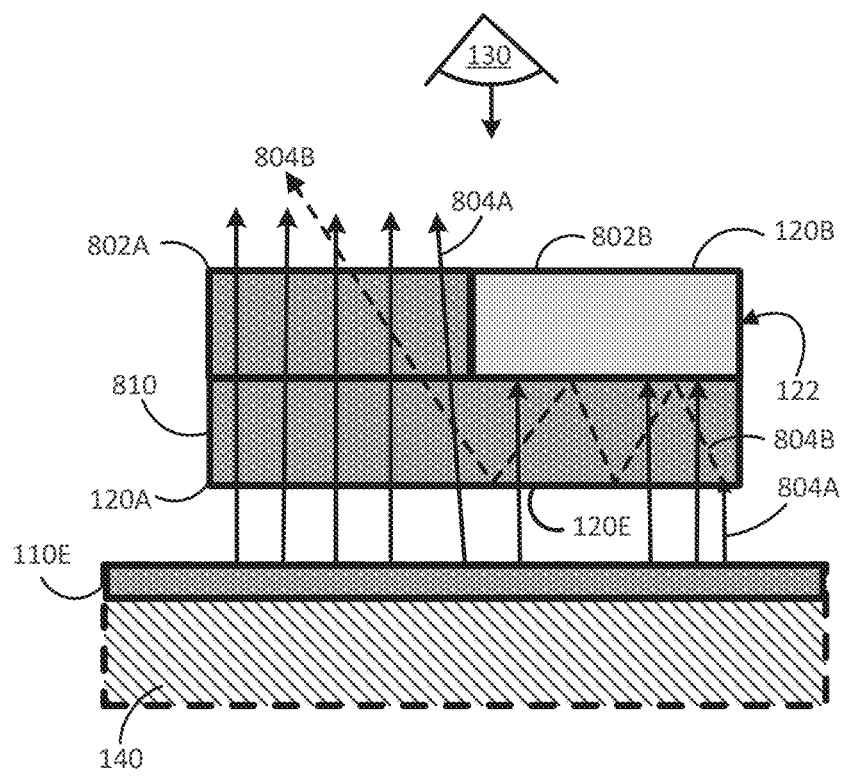
Figure 8B:
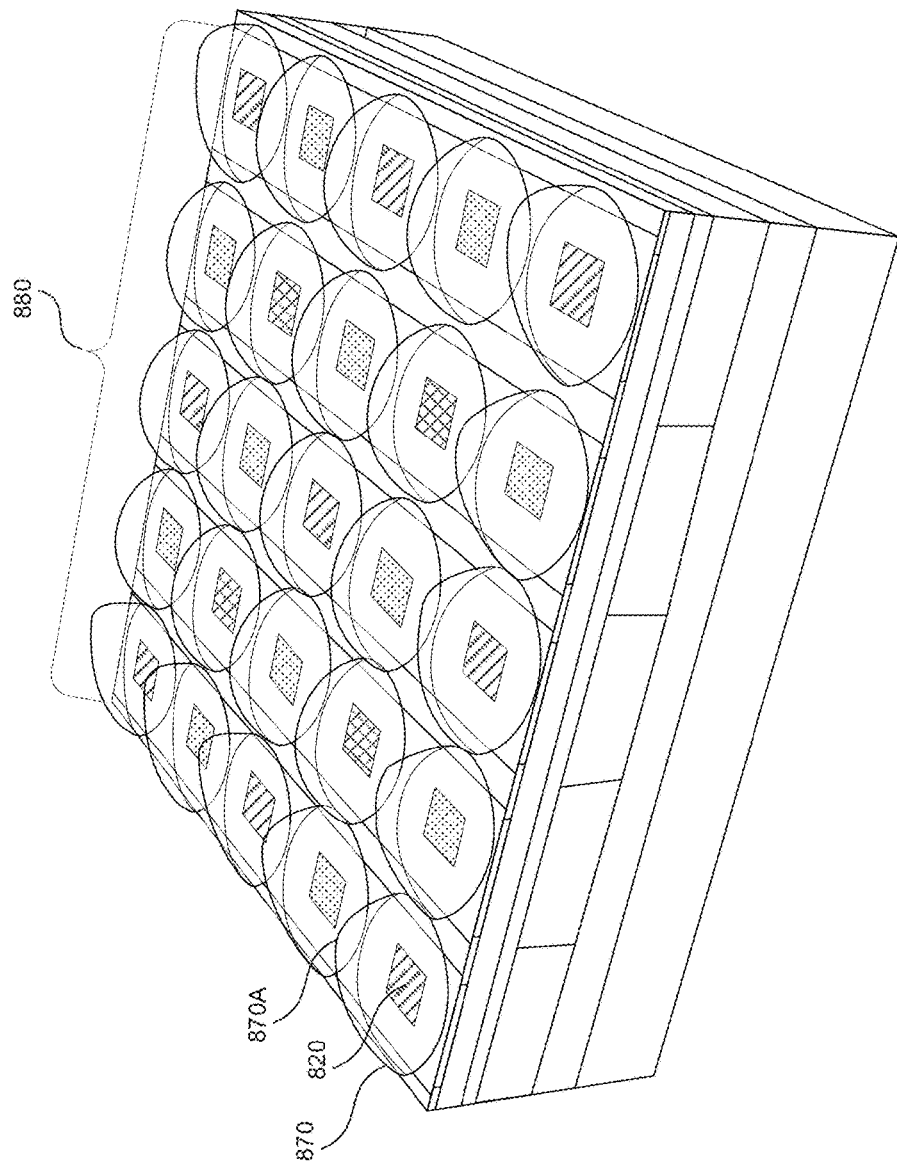
Figure 8C:
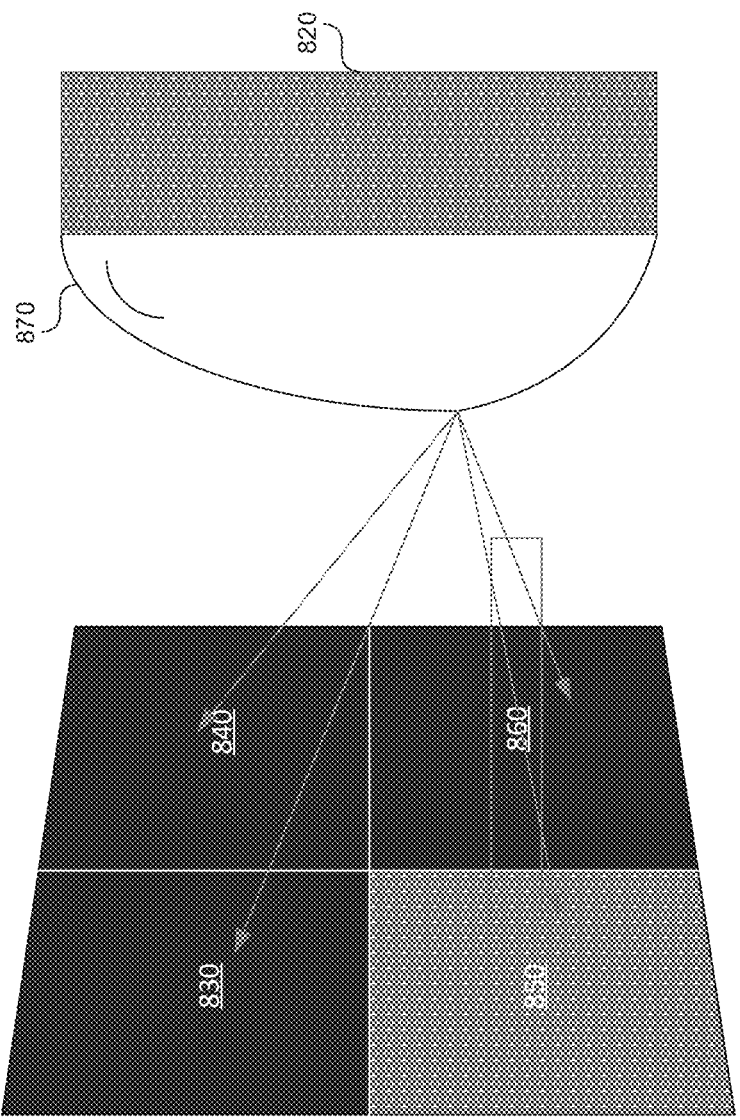

FIGS. 8A-8C show a light conductor according to various implementations. In FIG. 8A, display screen 110 and selective screen 120 are adjacent to each other such that the illumination of LEDs 140 may illuminate receiving side 120A of selective screen 120. Here, a portion of selective screen 120, e.g., a portion of section 120E, is placed in front of a pixel 140 to block the view of pixel 140 from camera 130.

Here, in a predefined sequence, images 100A-N may be displayed by display screen 110, which illuminates pixel(s) 140 of section 110E, which illuminates section 120E of selective screen 120 at receiving side 120A. For example, with regard to FIG. 2, at least some pixels 122 of section 120E, e.g., pixels 302, 304, 306, 308, allow or block illumination transmission through selective screen 120, forming pixel configurations 300A-D in FIG. 2, corresponding to at least some finer details of image 100 than displayed by display screen 110. In this illustration, LCD 802A is configured to transmit or pass illumination 804A, 804B, and LCD 802B is configured to block illumination 804A, 804B, from pixels 140.

In some configurations, to increase brightness from pixels 122, one or more LCD sections may be configured with a light conductor 810, to refocus, channel, and or amplify energy blocked by LCDs used for blocking illumination from portions of pixels 140. The light conductor 810 can be a light guide, a fiber optic cable, or a light pipe that guides a light beam 804B using total internal reflection to a visible portion of the pixel 802A. For example, if a brighter color is desired, a portion of the color being blocked may be channeled via light conductor 810 and retransmitted as illumination 804A through pixel 122 being used to form part of image 100.

Moreover, additional brightness may be obtained by channeling or redirecting light using the light conductor 810 from other adjacent LEDs 140 that are currently being blocked, but that are not part of the set of pixels that make up one of the images 100A-N being displayed. For example, illumination from LEDs 140 outside the set of pixels 122 may be redirected between pixels using one or more light conductors 810 that are configured to form one or more light channels between adjacent pixels 122. In this example, LEDs 140 outside the set of pixels 122 may otherwise be illuminated to a desired color and their energy redirected to one or more pixels 122. This configuration may be used to brighten the overall resulting image 100 and/or brighten particular pixels 122.

In FIG. 8B, the light conductor 810 (only one labeled for brevity) can be a micro lens 870, positioned above pixel 820 (only one labeled for brevity) of the display 110. The micro lens 870 can move, thus focusing the light coming from the pixel 820 to varying regions 830, 840, 850, 860 of the light receiver 130 in FIG. 1, as shown in FIG. 8C. For example, the micro lens 870 can be asymmetric, in other words not hemispherical. The apex of the micro lens 870A can be offset from center. The rotation of the micro lens 870 can cause the micro lens to focus the incoming light to region 850, as shown in FIG. 8C. An array 880 of micro lenses can create a super resolution image by focusing the incoming light to the various regions 830, 840, 850, 860 of the light receiver 130.

Figure 9A:
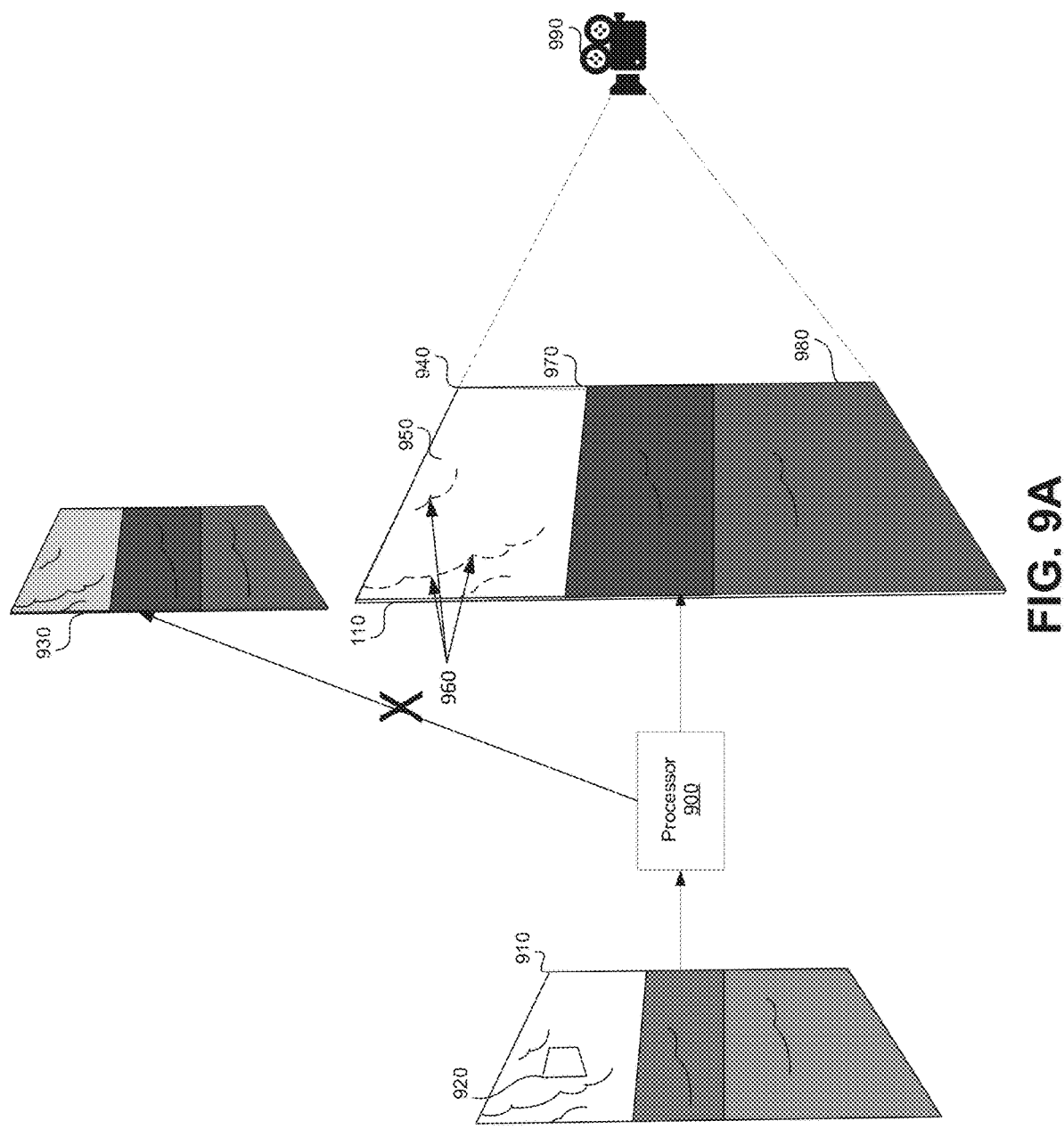
FIGS. 9A-9B show various techniques to increase luminance of a display.
Figure 9B:
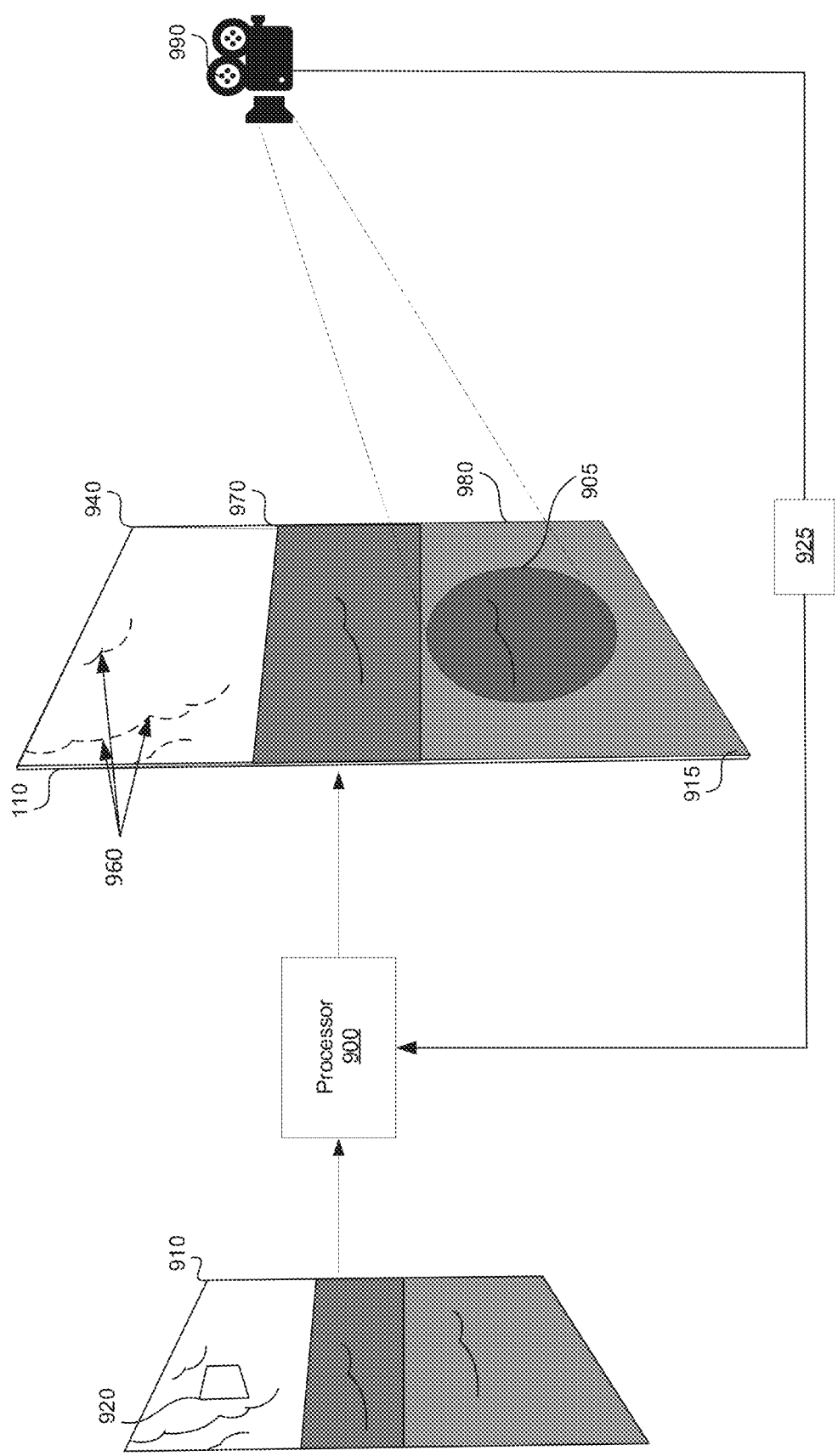

FIGS. 9A-9B show various techniques to increase luminance of the display 110. In FIG. 9A, a processor 900 can receive an input image 910 to present on the display 110. To increase the brightness of certain regions of the input image 910, the processor can detect pixel 920 in the input image 910 whose luminance is above a predetermined threshold. The predetermined threshold can be a weighted average of the minimum and maximum luminance of the display 110, of the input image 910, of a light receiver 990, etc. If the luminance of the pixel 920 is above the threshold, the processor 900 can disable the selective screen in front of the pixel 920, thus reducing the resolution of the pixel 920 in the output image but increasing the brightness of the pixel 920 in the output image. Consequently, instead of the display showing an image 930 with appropriate resolution and reduced luminance compared to the input image 910, the display shows an image 940 where pixels in the region 950 are bright, but do not have the appropriate image detail 960. For certain regions of the input image 910, such as the sky, image detail 960 may not be important. By contrast, regions 970, 980 presented on the display 110 have the appropriate image detail but are darker compared to the corresponding regions in the input image 910.

In FIG. 9B, the processor 900 can receive an indication 925 of an area of interest 905 of the light receiver 990. The area of interest 905 can be within the field of view of the light receiver 990, an area that is visible to the light receiver 990 because it is within the field of view and not blocked by props and/or actors in front of the display 110, or an area that is in focus for the light receiver 990. Generally, when a region of the image is out of focus, higher luminance is desirable because the blur tends to spread the light of the out of focus region, thus reducing its luminance. Similarly, when the area is not visible to the light receiver, super resolution of the area does not matter, and more accurate luminance is desirable.

The region of the image that is inside the area of interest 905 can be presented using the super resolution techniques described in this application. The region 915 of the image that is outside the area of interest 905 can be presented at the native resolution of the display 110. Consequently, the region of the image that is inside the area of interest 905 has high-resolution image detail, but low luminance, while the region 915 that is outside the area of interest 905 has low resolution and low image detail, but high luminance.

The processor 900 can receive the indication 925 of the area of interest 905 through a wired or a wireless network between the processor 900 and the light receiver 990. For example, the processor 900 can have a wireless transceiver in communication with a wireless transceiver associated with the light receiver 990. In another implementation, the processor 900 can receive an image that the light receiver 990 has recorded in the previous frame. For the current frame, the processor 900 can enable the selective screen in an area that is larger than the image, while disabling the selective screen outside the area.

Figure 10A:
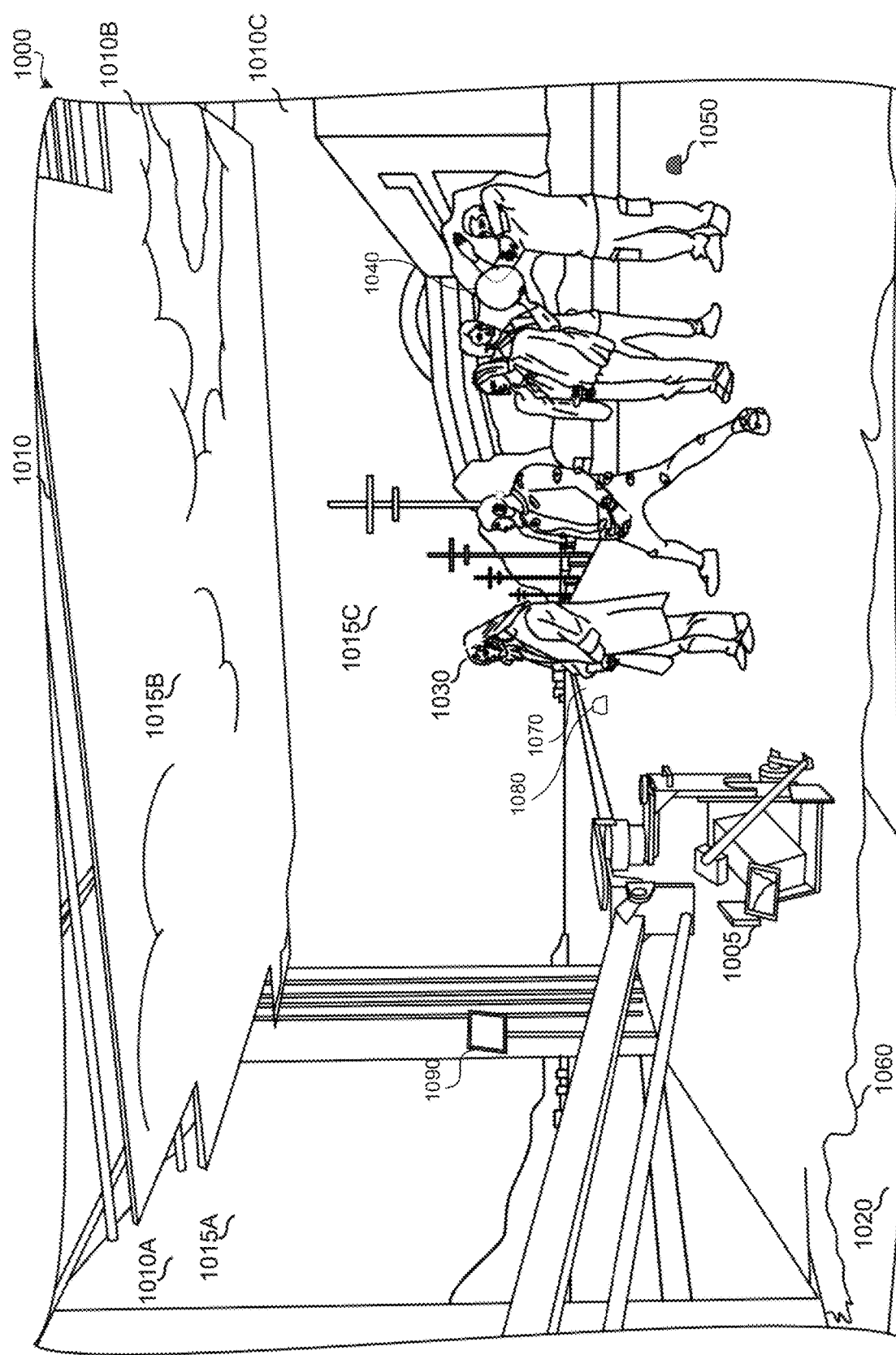
FIGS. 10A-10B show a virtual production set.
Figure 10B:
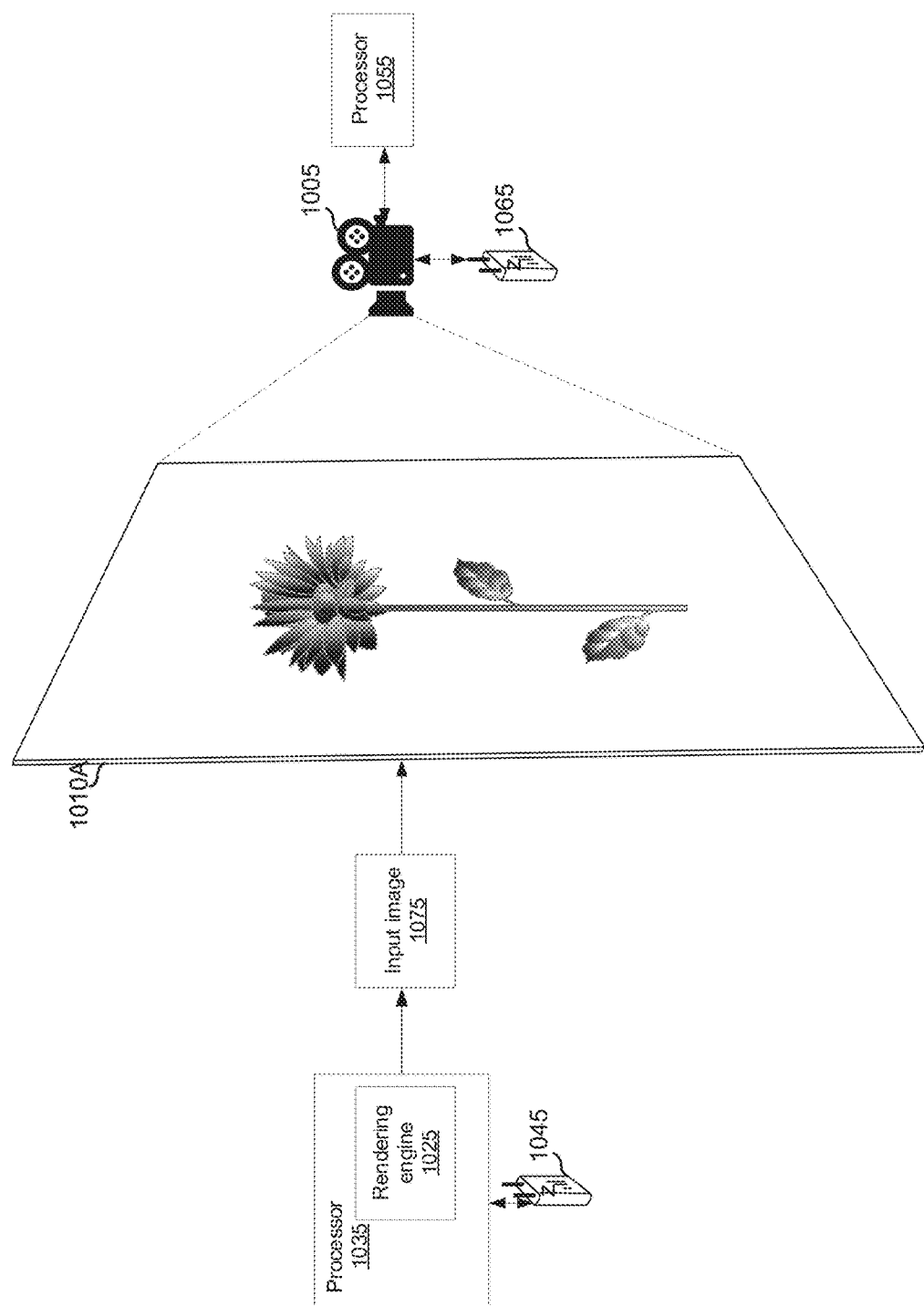

FIGS. 10A-10B show a virtual production set. The virtual production set 1000 includes a virtual production display ("display") 1010 which can surround a stage 1020. Display 1010 can be the display 110. The display 1010 can include multiple screens 1010A, 1010B, 1010C. One or more of the screens 1010A, 1010B, 1010C can be curved. The size of each screen 1010A, 1010B, 1010C can correspond to a size of a wall and exceed 6 feet in height and 3 feet in width. The screen can use various display technologies such as LCD, LED, OLED, rear projection, etc.

The stage 1020 is sufficiently large to include multiple actors 1030 and props 1040, 1050, 1060. The stage 1020 can seamlessly integrate with the screens 1010A, 1010B, 1010C presenting images 1015A, 1015B, 1015C, respectively. For example, the stage 1020 can include props, such as rocks 1050 and sand 1060, that mimic the appearance of rocks 1070 and sand 1080 that appear on the display 1010.

The display 1010 illuminates the stage 1020, actors 1030, and props 1040, 1050, 1060. Thus, the lighting of the environment matches the lighting of the actors 1030 and props 1040, 1050, 1060. In particular, highly reflective surfaces, such as metallic surfaces, properly reflect the environment. In addition to the display 1010 illumination, additional lights 1090 can illuminate the stage 1020.

The display 1010 needs to update the images 1015A, 1015B, 1015C to reflect events on the stage 1020 such as motion of the actors 1030, parallax to correctly create a sense of depth, interaction between the actors 1030 and the images 1015A-1015C, etc. In other words, the display 1010 needs to render in real time. A rendering engine 1025, such as Unreal Engine or Gazebo, running on a processor 1035 can render the images 1015A-1015C in real time in response to events on the stage 1020. The rendering engine 1025 can communicate with a camera 1005 using a wired or a wireless network.

The camera 1005 can record the stage 1020 including images presented on the display 1010, actors 1030, and props 1040, 1050, 1060. The camera 1005 and the processor 1035 can each be coupled to a wireless transceiver 1065, 1045, respectively, through which the rendering engine 1025 can track the camera movement, and through which the processor and the camera can communicate.

Figure 11:
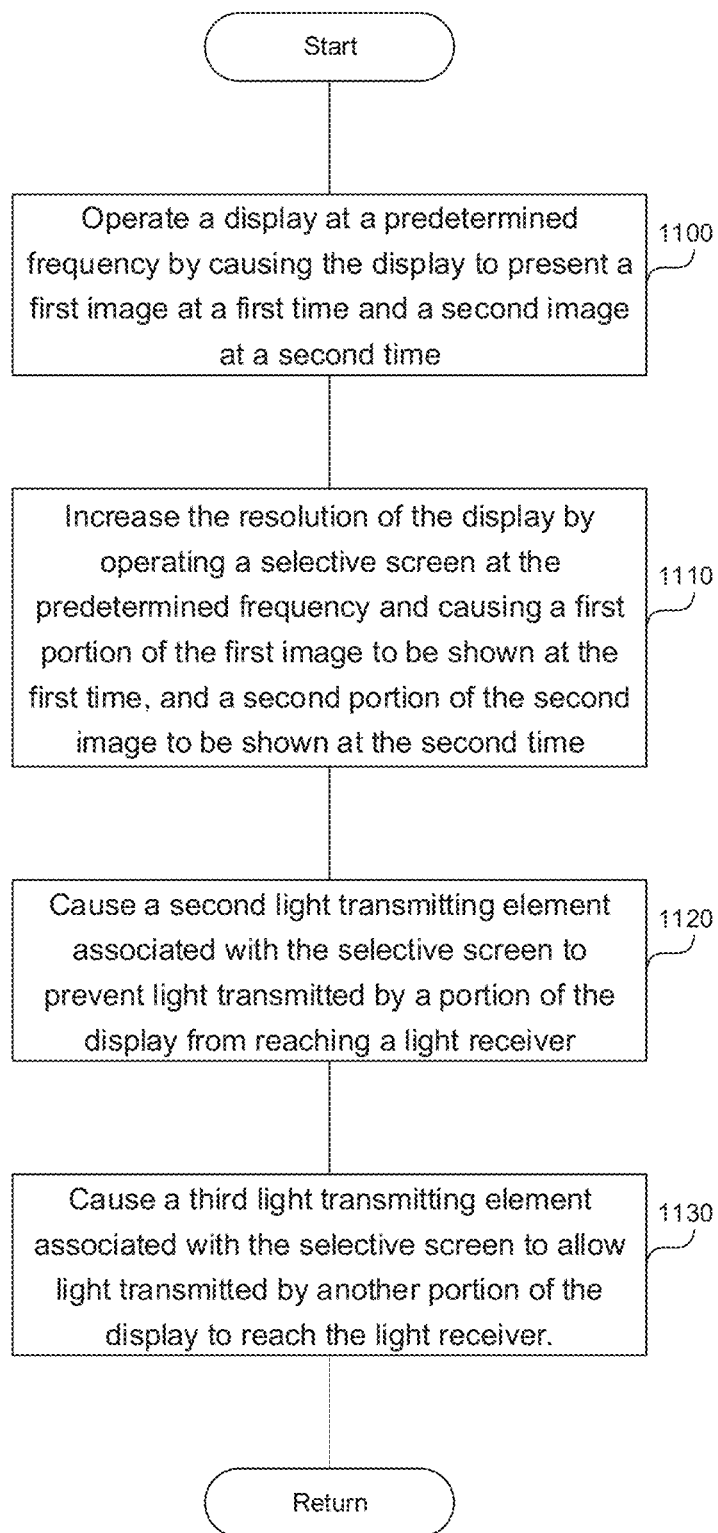
FIG. 11 is a flowchart of a method to increase apparent resolution of a display.

FIG. 11 is a flowchart of a method to increase apparent resolution of a display. In step 1100, a software or hardware processor executing instructions described in this application can operate a display at a predetermined frequency by causing the display to present a first image at a first time and a second image at a second time. The predetermined frequency can be anywhere between 12 and 100 frames per second (FPS), such as 24 FPS, 30 FPS, 60 FPS, etc. The display can include a first set of light transmitting elements defining the resolution of the display. For example, if the display is an LED display, the first set of light transmitting elements includes LEDs. If the display is an LCD display, the first set of light transmitting elements includes liquid crystals. If the display is an OLED display, the first set of light transmitting elements can include organic light emitting diodes. If the display is a rear projector or a front projector, the first set of light transmitting elements can include digital micromirror devices. The selective screen can also act as the reflector to reflect light coming from the projector towards the display.

The frequency associated with the light receiver indicates a length of time the light receiver needs to form the image. If the light receiver's frequency cannot be adjusted, the predetermined frequency corresponds to a frequency associated with the light receiver divided by at least a number of elements in the multiple light transmitting elements. For example, the predetermined frequency can be equal to the frequency associated with the light receiver divided by the number of elements in the multiple light transmitting elements.

In step 1110, the processor can increase the resolution of the display by operating a selective screen at the predetermined frequency and causing a first portion of the first image to be shown at the first time, and a second portion of the second image to be shown at the second time. The first portion of the first image and the second portion of the second image can be different. The predetermined frequency enables the light receiver to form the image based on the first portion of the first image, and the second portion of the second image. The selective screen can include a second set of light transmitting elements defining the resolution of the selective screen. The second set of light transmitting elements can include a micro lens, a digital micromirror device, a liquid crystal display, or an electrochromic layer. The selective screen is disposed between the first set of light transmitting elements and the light receiver. The light receiver can be a camera or a person's eye. A first light transmitting element among the first set of light transmitting elements can correspond to multiple light transmitting elements associated with the selective screen. The resolution of the selective screen can be higher than the resolution of the display. The resolution is defined as the number of light transmitting elements per unit length, such as inch.

In step 1120, the processor can cause a second light transmitting element among the multiple light transmitting elements to redirect light transmitted by the first light transmitting element. In step 1130, the processor can cause a third light transmitting element among the multiple light transmitting elements to allow light transmitted by the first light transmitting element to reach the light receiver. The second light transmitting element and the third light transmitting element can form at least a part of a liquid crystal display, a digital micromirror device, or an electrochromic display.

The second light transmitting element and the third light transmitting element can each have a unique identifier. Alternatively, the second light transmitting element can be part of a first group of pixels, where the whole first group has a unique identifier. Similarly, the third light transmitting element can be part of a second group of pixels, where the whole second group has a unique identifier different from the identifier associated with the first group.

The processor can obtain a second unique identifier associated with the second light transmitting element, and a third unique identifier associated with the third light transmitting element. Based on the second unique identifier, the processor can instruct the second light transmitting element to change a state. The state of the second light transmitting element can include an opaque state configured to block light transmitted by the first light transmitting element, and a transmissive state configured to allow light transmitted by the first light transmitting element to pass. Based on the third unique identifier, the processor can instruct the third light transmitting element to change a state of the third light transmitting element. Similarly, the state of the third light transmitting element can include the opaque state configured to block light transmitted by the first light transmitting element, and the transmissive state configured to allow light transmitted by the first light transmitting element to pass. The processor's instructing the second light transmitting element and the third light transmitting element occurs at the predetermined frequency. The instructions sent to the second and third light transmitting elements are synchronized to the predetermined frequency of the display. In other words, when the display changes, the state of the second and third light transmitting elements changes.

The processor can enable light from a first portion of a first image among the multiple images to reach the light receiver when the display is presenting the first image. The processor can enable light from a second portion of a second image among the multiple images to reach the light receiver when the display is presenting the second image. The first portion of the first image and the second portion of the second image occupy different regions of the display. To enable the light to reach the light receiver, the processor can change a state of at least a portion of the selective screen at the predetermined frequency. Changing the state can include moving the at least a portion of the selective screen or changing transmission properties of the at least a portion of the selective screen. The transmission properties can include opacity, polarization, and/or lens alignment. The processor can align the portion of the selective screen with the first portion of the first image when the display is presenting the first image, and align the portion of the selective screen with the second portion of the second image when the display is presenting the second image. The portion of the selective screen can allow light from the display to reach the light receiver.

The processor can operate the light receiver at a second predetermined frequency, where the second predetermined frequency is lower than a frequency of operation of the display. The second predetermined frequency can be equal to the predetermined frequency divided by a number of elements in the multiple light transmitting elements.

The processor can cause a light conductor associated with a first portion of the selective screen to guide a light beam blocked by the first portion of the selective screen to a second portion of the selective screen, thereby increasing brightness of light emanating from the display. The first portion of the selective screen can redirect light from the display, and the second portion of the selective screen can allow light from the display to reach the light receiver. The light conductor can be a light guide, a fiber optic cable, or a light pipe.

Figure 12:
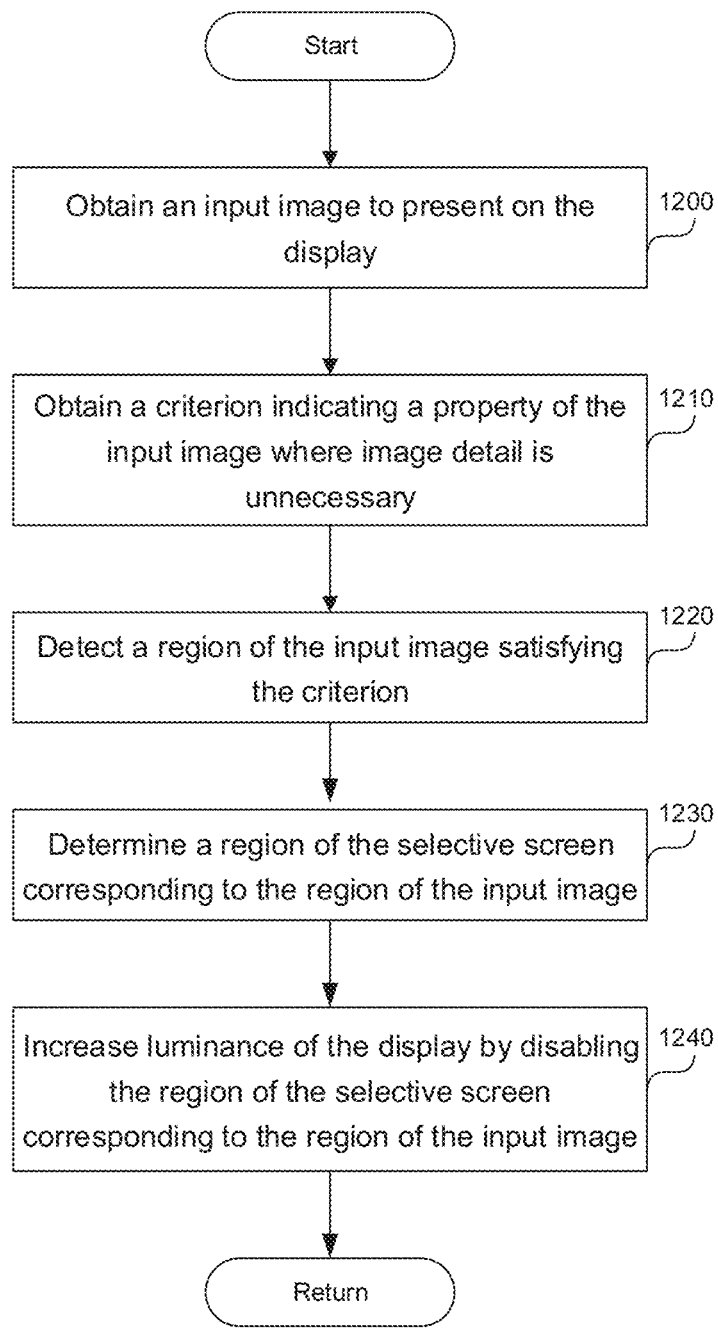
FIG. 12 is a flowchart of a method to modify luminance of a super resolution display.

FIG. 12 is a flowchart of a method to modify luminance of a super resolution display. In step 1200, a processor can obtain an input image to present on the display. The display can be associated with a selective screen, as described in this application. The display can be a virtual production display as described in FIG. 10. The display is configured to provide a light receiver with an image having resolution higher than the resolution of the display. To achieve the high resolution, the display can present multiple images associated with the input image while the selective screen enables light from different portions of the multiple images to reach the light receiver. The multiple images can be varying portions of the input image, such that the multiple images put together create the input image. One of the multiple images can be the input image, and the other multiple images can correspond to other input images. By recording the multiple images presented by the display, the light receiver forms a super resolution output image including the different portions of the multiple images. While the output image has higher resolution than the input image, the luminance of the output image is lower than a combination, e.g., a sum, of luminance values of the multiple images. The camera, the selective screen, and the display are synchronized in a manner causing the camera to perceive the multiple images as a single image.

In step 1210, the processor can obtain a criterion indicating a property of the input image where image detail is unnecessary. In step 1220, the processor can detect a region of the input image satisfying the criterion. The region can be a single pixel or a group of pixels.

In step 1230, the processor can determine a region of the selective screen corresponding to the region of the input image. In step 1240, the processor can increase luminance of the display by disabling the region of the selective screen corresponding to the region of the input image, thereby decreasing resolution of a region of the display corresponding to the region of the input image.

In one implementation, to obtain the criterion, the processor can obtain a threshold between a minimum luminance of the display and a maximum luminance of the display. To detect the region, such as a pixel or a group of pixels, the processor can detect the region of the input image having an original luminance above the threshold. The processor can detect an edge in the image. The processor can determine whether the region of the input image is proximate to the edge in the image. Upon determining that the region of the input image is proximate to the edge in the image, the processor can enable the region of the selective screen corresponding to the region of the input image. Upon determining that the region of the input image is not proximate to the edge in the image, the processor can disable the region of the selective screen corresponding to the region of the input image. In other words, if the right pixel is close to an edge in the image, the processor preserves the super resolution of the pixel because edge regions are important to human vision.

In another implementation, the processor does not have to perform edge detection, and upon detecting a region whose luminance is above the threshold, the processor can disable the selective screen in front of the region.

In a third implementation, to obtain the criterion, the processor can obtain a region of focus associated with the light receiver. To detect the region, the processor can detect the region of the input image outside the region of focus associated with the light receiver. Consequently, the processor can increase brightness and decrease resolution of the region that is not in focus of the light receiver. To obtain the region of focus, the processor can receive from the light receiver an indication of lens settings of the light receiver and light receiver position.

In a fourth implementation, to obtain the criterion, the processor can obtain an indication to detect an area associated with the display invisible to the light receiver, or an area that is not directly visible to the light receiver. The invisible area, or an area that is not directly visible to the light receiver, can be outside the camera's field of view, or the area can be obscured by actors or props in front of the display. The processor can detect the region of the input image invisible to the light receiver, and can disable the selective screen in front of the region.

In a fifth implementation, to obtain the criterion, the processor can obtain an input from a user indicating in which area of the display screen to trade-off luminance for detail. For example, the processor can present a slider to the user to indicate an amount of trade-off between and detail.

The processor can divide the region of the selective screen into a first region and a second region, where the second region provides a transition region between the first region and a remainder of the display. For example, the second region can surround the first region so that the second region borders the remainder of display and the first region, while the first region only borders the second region. The processor can obtain a first luminance associated with the first region, and a third luminance associated with the remainder of the display. The processor can adjust a second luminance associated with the second region according to an interpolation between the third luminance and the first luminance. To adjust the luminance, the processor can adjust the brightness of the screen or can adjust the transparency of the selective screen.

Increasing Resolution of a Display in Postprocessing

Figure 13:
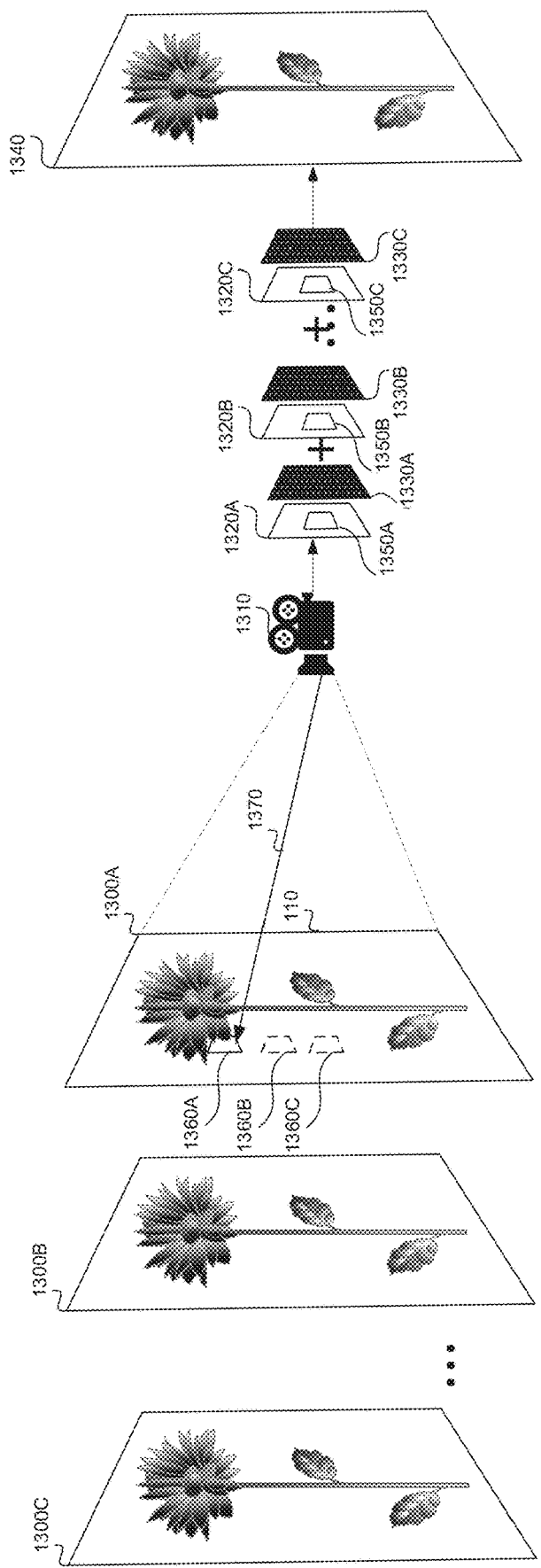
FIG. 13 shows a system to increase resolution of an image in postprocessing by displaying and recording multiple images at high frequency.

FIG. 13 shows a system to increase resolution of an image in postprocessing by displaying and recording multiple images at high frequency. Display 110, such as virtual production display 1010 in FIG. 10, can present multiple images 1300A, 1300B, 1300C at high frequency. The high frequency can be a frame rate higher than a frame rate needed to form a perception of motion. For example, a human eye can perceive motion if presented with 12 images per second. Most film cameras operate at a base frame rate such as 24 FPS, but other frame rates are possible such as 48 FPS, 30 Hz, 60 Hz, etc. The display 110 can operate at a frame rate that is the base frame rate times the number of images, e.g., subframes, 1300A, 1300B, 1300C displayed within a base rate single frame. For example, if the display 110 base rate was 24 FPS, but the display 110 was displaying four subframes in place of one base rate single frame, the display 110 can operate at 4×24=96 FPS.

The light receiver 1310, such as a camera, can operate at a second frame rate proportional to the frame rate of the display 110. If the frame rate of the display 110 increases, the frame rate of the light receiver 1310 also increases.

For example, if the light receiver 1310 operates at 24 FPS, the light receiver shutter usually captures light for a 48th of a second, then is off for a 48th of a second. Let us assume that we want to capture at least four subframes 1300A, 1300B, 1300C, 1300D (not pictured) for each base rate single frame ("frame"), however other numbers of subframes are possible such as 2, 3, 5, 6, etc. To accomplish this, the light receiver can operate at 192 FPS, taking eight subframes per frame with no "off" gap between them. Then the light receiver 1310 can discard the four frames that correspond to the "off" period of the exposure. In an alternative implementation, the light receiver 1310 can operate at 96 FPS, taking a burst of four subframes at ¹⁄₁₉₂ of a second apart, then have a gap for a 48th of a second. In this implementation, the light receiver 1310 does not store unnecessary pictures on disks, such as the discarded four frames, and does not overheat the electronics making them.

In a third implementation, the light receiver can operate at 96 FPS, taking pictures continuously. The third implementation produces a higher quality image because the subframes have 96th of a second exposure, not ¹⁄₁₉₂ of a second exposure, so less light is required on set to record a clean image at the light receiver 1310.

The light receiver 1310 can record the images 1300A, 1300B, 1300C to obtain recorded images 1320A, 1320B, 1320C. A processor associated with the light receiver 1310 can combine the recorded images 1320A, 1320B, 1320C to obtain an output image 1340. The output image 1340 can be the high-res image.

To combine the recorded images 1320A, 1320B, 1320C, in one implementation, the processor can apply masks 1330A, 1330B, 1330C to each of the recorded images. Each mask 1330A, 1330B, 1330C blocks off a portion of the corresponding image 1320A, 1320B, 1320C and allows a portion of the corresponding image to be visible. When the three masks 1330A, 1330B, 1330C are applied to a single image in turn, the output image is the single image.

To combine the recorded images 1320A, 1320B, 1320C, in a second implementation, the processor does not rely on the recorded images 1320A, 1320B, 1320C, and instead determines a region of the multiple images visible to a light receiver based on the image as presented on the display 110. In this implementation, even if the camera is moving, and different portions of the display 110 are visible to the light receiver 1310, the processor can combine pixels from various regions of the display 110 to obtain a pixel in the output image 1340. By combining pixels from various parts of the subframes 1300A, 1300B, 1300C, the processor can create an appearance of motion blur.

In the second implementation, the processor can obtain images presented on the display 110 via metadata. In one implementation, the metadata can include the images presented on the display 110. In another implementation, the metadata can include a timecode that synchronizes images presented on the display 110 and those captured by the light receiver 1310. The timecode keeps different cameras on set and display screens 1010A, 1010B, 1010C synchronized, and also gives each frame a unique number, consistent across all devices. Once the processor knows the timecode such as 1, 2, 3, 4, the processor knows which image is presented on the display 110.

To determine which pixel in the output image 1340 corresponds to which pixel on the display 110, the processor can obtain the display 110 position and light receiver 1310 position in each frame. The information about position can come from a set survey and/or a motion capture device on the light receiver 1310. The motion capture device can be operated with a motion control system. Based on the light receiver 1310 position per subframe, and the display 110 position, the processor can determine a relationship between pixels in the recorded images 1320A, 1320B, 1320C captured by the light receiver 1310 and the pixels in the images 1300A, 1300B, 1300C on the display 110.

To determine a relationship between pixels 1350A, 1350B, 1350C in the recorded images 1320A, 1320B, 1320C and the pixels in the presented images 1300A, 1300B, 1300C, each pixel 1350A, 1350B, 1350C in the recorded image is taken in turn. That pixel 1350A, 1350B, 1350C corresponds to a ray 1370 in space. A ray/plane intersection test produces the precise position of a pixel 1360A, 1360B, 1360C on the display 110 that corresponds to the pixel 1350A, 1350B, 1350C. The pixels 1350A, 1350B, 1350C can be the same pixel in the light receiver 1310. The pixels 1360A, 1360B, 1360C can be the same pixel, or can be different pixels due to the motion of the light receiver. The color of the pixels 1360A, 1360B, 1360C comes from whichever subframe is presented on the display at the time when the image 1320A, 1320B, 1320C was recorded.

For example, let us assume that there is no motion blur and there are four masks 1330A, 1330B, 1330C, 1330D (not pictured) each of which blocks one fourth of a pixel in the corresponding image. The pixel 645, 455 in the light receiver's recorded image 1320A, 1320B, 1320C might correspond to the upper-right quadrant of pixel 200, 205 in the display 110. Because the subframe sequence is known, the processor knows the upper-right quadrant of pixel 200, 205 was displaying subframe 2 out of 4, so pixel 645, 455 in the output image comes from pixel 645, 455 in the second subframe.

When there is motion blur, a pixel in the output image corresponds to a line across the screen, as the light receiver 1310 movement causes the recording pixels of the light receiver to trace a path across the display 110. To handle motion blur, the output value of the pixel 1350A, 1350B, 1350C may have to come from multiple subframes fused together, possibly from slightly different pixel locations.

Figure 14A:
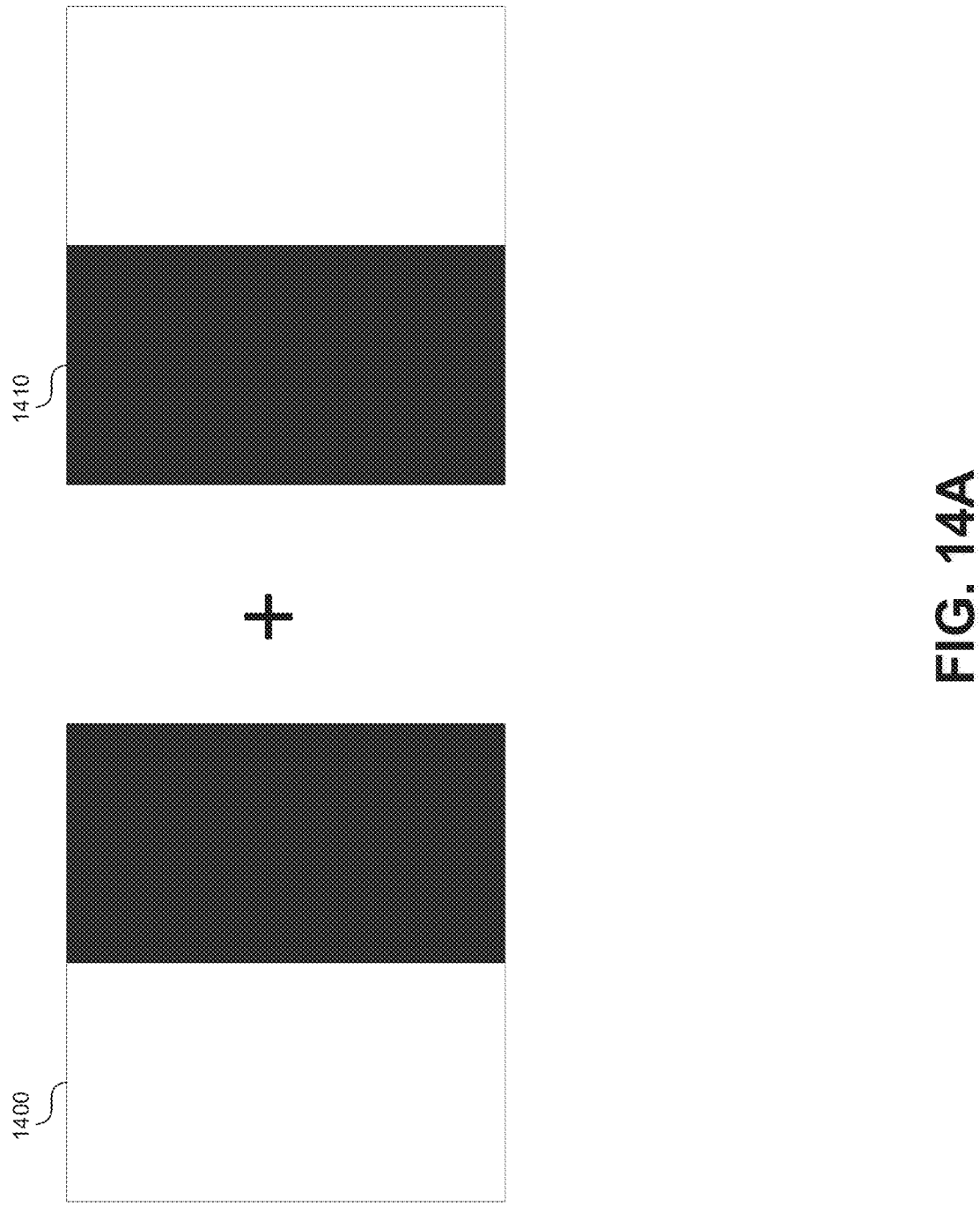
FIGS. 14A-14C show various masks to use an increasing resolution of an image.
Figure 14B:
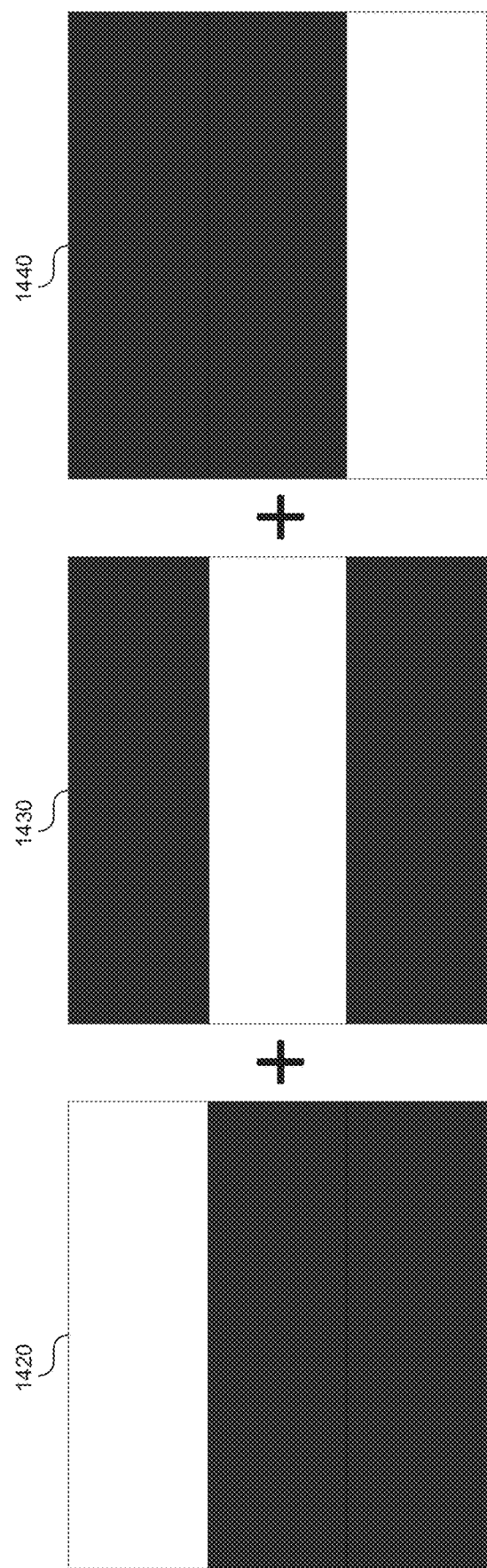
Figure 14C:
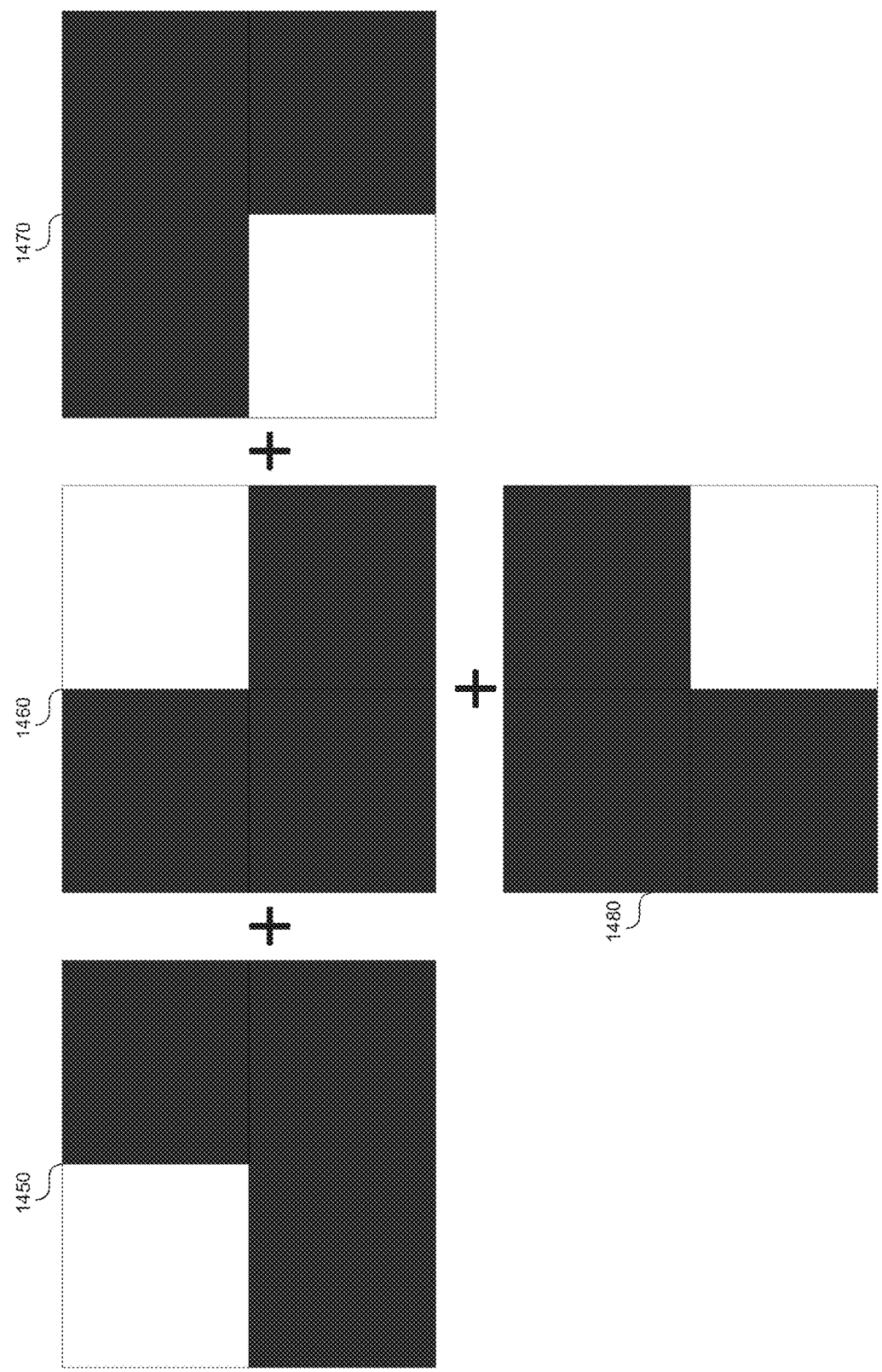

FIGS. 14A-14C show various masks to use in increasing resolution of an image. Each mask 1400, 1410, 1420, 1430, 1440, 1450, 1460, 1470, 1480 can be a pixel mask, meaning that each mask 1400-1480 can be applied to a single pixel. Masks 1400, 1410 are complementary masks that can be applied to two subframes, thus increasing the resolution of an image by 2. Masks 1420, 1430, 1440 are complementary masks that can be applied to three subframes, thus increasing the resolution of the output image by 3. Finally, masks 1450, 1460, 1470, 1480 are complementary masks that can be applied to four subframes, thus increasing the resolution of the output image by 4. Masks increasing the output of the resolution image by 5, 6, 7, etc., are also possible.

Figure 15:
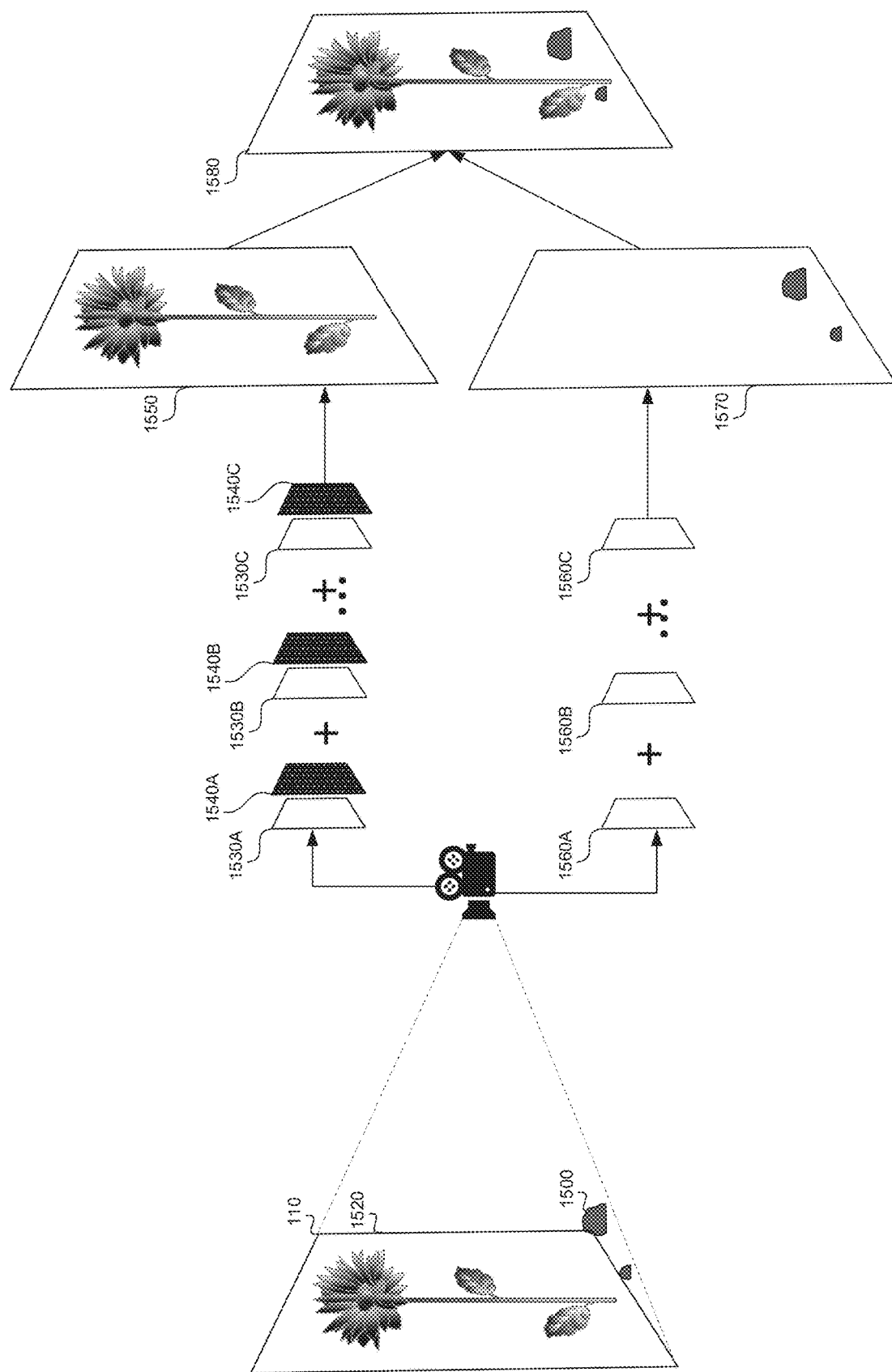
FIG. 15 shows a separation and different processing of a background and a foreground element.

FIG. 15 shows a separation and different processing of a background and a foreground element. The display 110, such as the virtual production display 1010 in FIG. 10, can have various foreground elements 1500, 1510, such as actors and props, placed in front of the display 110. Foreground elements 1500, 1510 are not limited to the resolution of the display 110 because they are not presented on display 110, and thus increasing the resolution by combining multiple images using masks is unnecessary. Recording the foreground elements at a high frequency, such as 96 FPS, can cause a strobing effect, and thus the foreground elements may need to be treated differently to create a sense of motion blur.

To detect foreground elements 1500, 1510, a processor can compare pixels 1350A, 1350B, 1350C in the recorded images 1320A, 1320B, 1320C in FIG. 13, as recorded by the light receiver 1310 in FIG. 13, to the corresponding pixels 1360A, 13608, 1360C on the display 110. If the two colors are different from each other above a predetermined threshold, then the processor concludes that the pixels belong to a foreground element 1500, 1510.

The processor can then separate the foreground elements 1500, 1510 from the background 1520, and apply different processes to each. For example, for the background 1520, multiple subframes 1530A, 1530B, 1530C can be combined with their corresponding masks 1540A, 1540B, 1540C to obtain a super resolution output image 1550. For the foreground elements 1500, 1510, two or more of the subframes 1560A, 1560B, 1560C can be combined, without using the masks. Instead, to combine the subframes, the processor can average two or more of the subframes 1560A, 1560B, 1560C together to calculate a motion blurred output image 1570. The output images 1550 and 1570 can be the same image, or can be two different images, which are then combined to obtain the final output image 1580.

Figure 16:
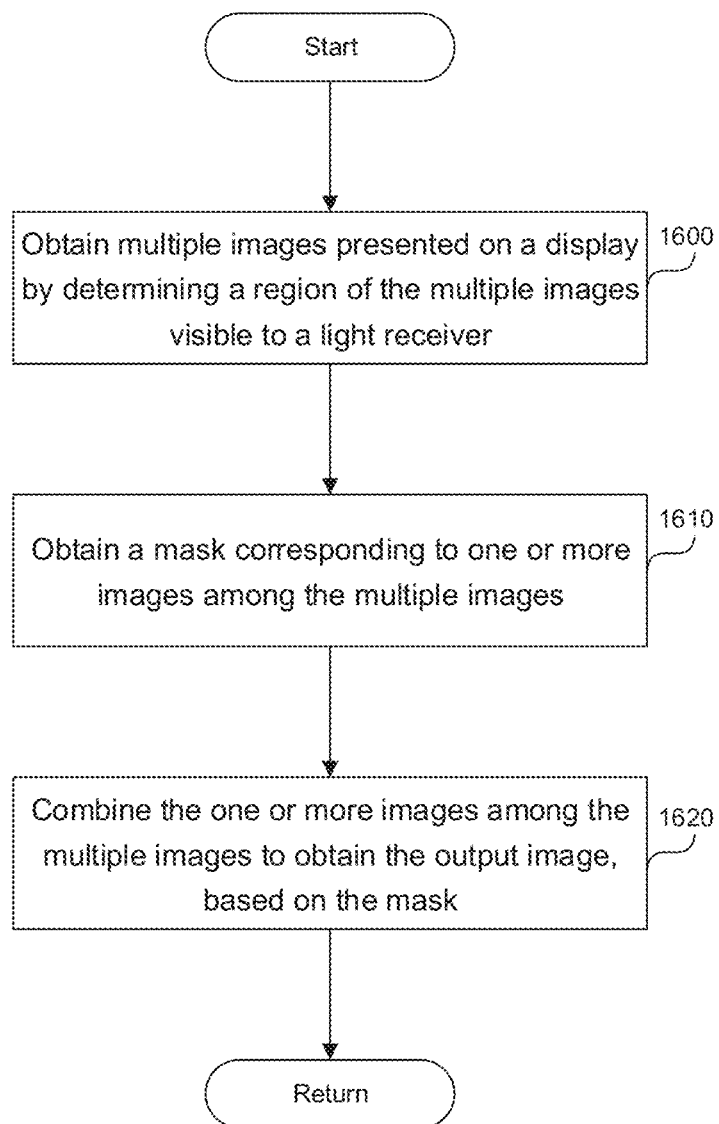
FIG. 16 is a flowchart of a method to increase resolution of a display in postprocessing.

FIG. 16 is a flowchart of a method to increase resolution of a display in postprocessing. In step 1600, a hardware or software processor executing instructions described in this application can obtain multiple images presented on a display by determining a region of the multiple images visible to a light receiver. To obtain the multiple images, in one implementation, the processor can obtain multiple images recorded by the camera. In another implementation, the processor can use knowledge of the camera position, the display position, the camera orientation, and the images presented on the display to determine a portion of an image on the display wall visible to the camera. The camera can be the light receiver, as described in this application.

The display can present the multiple images at a first frame rate higher than a frame rate needed to form a perception of motion. The first frame rate can be 48 FPS, 96 FPS, 120 FPS, 192 FPS. The first frame rate can be the number of subframes times 24 FPS, or the number of subframes times 30.

The light receiver can operate a second frame rate proportional to the first frame rate. The second frame rate can be the same as the first frame rate. Both the first frame rate and the second frame rate are higher than the frame rate needed to form a perception of motion in proportion to a number of multiple images, e.g., subframes, presented on the display. For example, if there are three subframes presented for each frame, the light receiver and the display can operate at 72 FPS, because 72 FPS is equal to 24 FPS×3 subframes. The first and the second frame rate can be an integer multiple of 24, 25, 30, 24000/1001, or 30000/1001 FPS.

In one implementation, to determine the region of the multiple images visible to the light receiver, the processor can record the multiple images presented on the display using the light receiver. The processor can register the recorded images among themselves, by identifying pixels in each image corresponding to pixels in the rest of the images. The correspondence can be 1-to-1, and the upper-left corner pixel in each image can line up. The processor can then combine the multiple images using masks to obtain a super resolution output image.

In another implementation, to determine the region of the multiple images visible to the light receiver, the processor can obtain an indication of a particular time, a position associated with the light receiver at the particular time, and a position of the display at the particular time. For each pixel associated with the light receiver, the processor can, based on the indication of the particular time, obtain an image among the multiple images presented on the display. The processor can, based on the light position associated with the light receiver, and the position of the display, determine the region associated with the image that corresponds to each pixel associated with the light receiver. The processor can obtain a color associated with the region associated with the image. A region can include multiple pixels in the input image. In other words, one pixel in the output image can come from multiple pixels and the input image, particularly when there is motion blur. When there is motion blur, a pixel in the output image corresponds to a line across the screen. To handle that, the output value may have to come from multiple subframes fused together, possibly from slightly different pixel locations.

In step 1610, the processor can obtain a mask corresponding to one or more images among the multiple images, where the mask indicates a portion of the one or more images among the multiple images to include in an output image. The mask can numerically indicate the portion of each image among the multiple images to include in an output image. For example, the mask can be a fraction such as one-half, one-third, one-fourth, one-fifth, etc., indicating that one-half, one-third, one-fourth, one-fifth, etc., respectively, of each pixel is visible at each subframe. The mass can graphically indicate the portion of each image among the multiple images to at least partially included in the output image, as shown in FIGS. 14A-14C.

In step 1620, the processor can increase resolution of the display in proportion to a number of multiple images presented to the display by combining, based on the mask, the one or more images among the multiple images to obtain the output image. To combine the images, the processor can, based on the mask, determine a first region of a first image among the multiple images and a second region of a second image among the multiple images. The processor can combine, by for example adding, the first region and the second region to the output image. The mask can include an alpha channel indicating a portion of the first region and a portion of the second region to include in the output image. In that case, the processor can combine the first region and the second region to obtain the output image by interpolating between the first region and the second region based on the mask.

The processor can separate the foreground and the background elements from the recorded image and apply different postprocessing techniques to the foreground and the background, as explained in FIG. 15. The processor can identify in the output image a representation of an object and an image among the multiple images presented on the display. The object can be a prop or an actor. The object is not part of the image presented on the display. The object and can be disposed between the display and the light receiver. For a region in the output image belonging to the representation of the object, the processor can obtain a corresponding region in at least a subset of images among the multiple images, e.g., subframes, to obtain multiple corresponding regions. The processor can combine the multiple corresponding regions to obtain a combined region. To combine the multiple corresponding regions in the subframes, the processor can average all the subframes or a subset of the subframes, such as two out of the four subframes. The averaging of the subframes helps create an appropriate motion blur and reduces the image noise that is introduced by running the light receiver at a faster frame rate. The processor can replace the representation of the object with the combined region.

To identify in the output image the representation of the object, the processor can obtain a first image recorded by the light receiver. The processor can obtain at least a portion of a second image presented on the display and within a field of view of the light receiver. The processor can determine whether a first region of the first image matches a second region of the at least a portion of the second image. The region can include one or more pixels. Upon determining that the first region and the second region do not match, the processor can identify the first region as at least a portion of the representation of the object.

Visual Content Generation System

Figure 17:
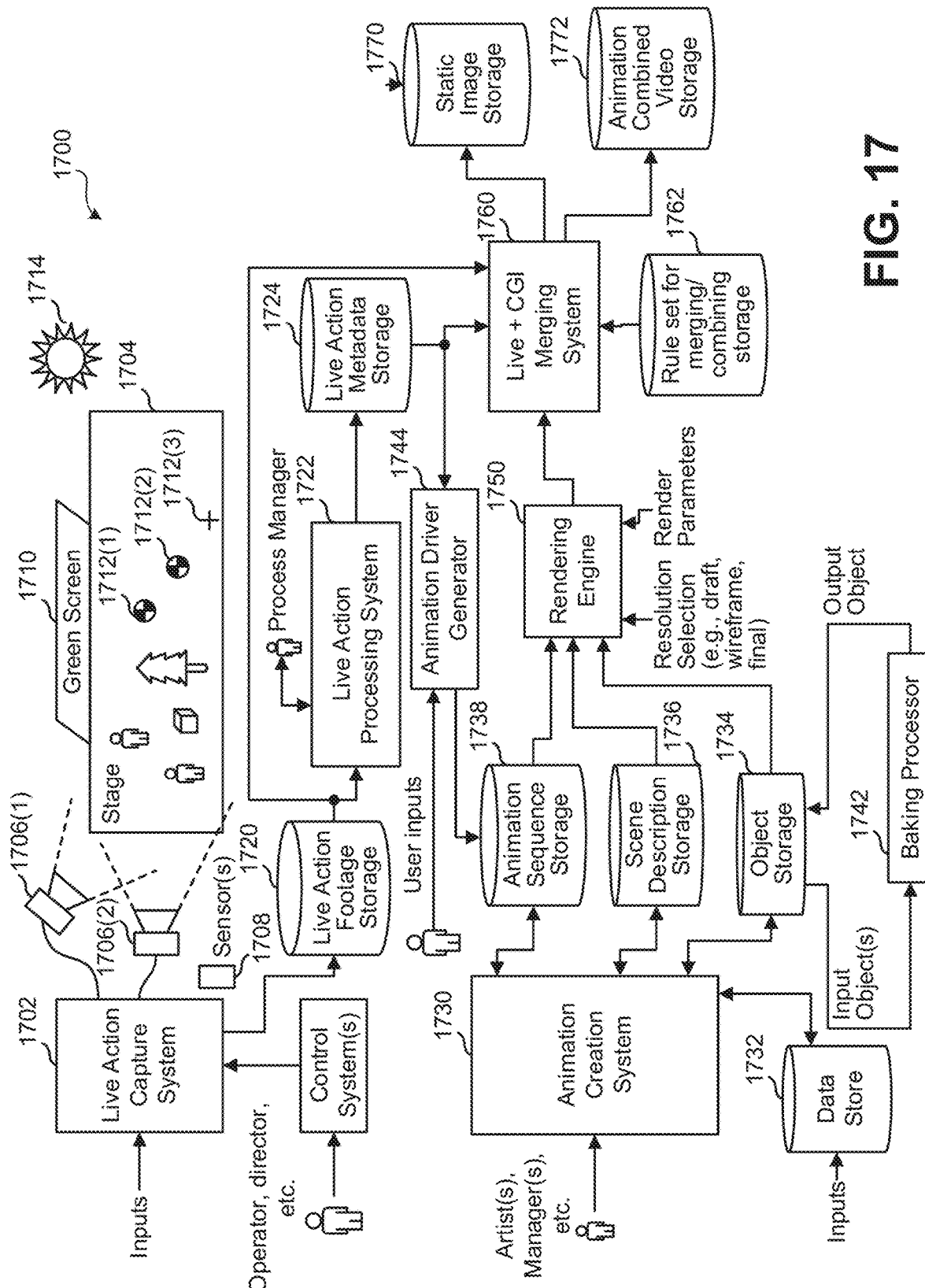
FIG. 17 illustrates an example visual content generation system as might be used to generate imagery in the form of still images and/or video sequences of images.

FIG. 17 illustrates an example visual content generation system 1700 as might be used to generate imagery in the form of still images and/or video sequences of images. Visual content generation system 1700 might generate imagery of live action scenes, computer-generated scenes, or a combination thereof. In a practical system, users are provided with tools that allow them to specify, at high levels and low levels where necessary, what is to go into that imagery. For example, a user might be an animation artist who uses visual content generation system 1700 to capture interaction between two human actors performing live on a sound stage. The animation artist might replace one of the human actors with a computer-generated anthropomorphic non-human being that behaves in ways that mimic the replaced human actor's movements and mannerisms, and then add a third character and background scene elements that are all computer-generated, in order to tell a desired story or generate desired imagery.

Still images that are output by visual content generation system 1700 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution. Images might or might not be stored in a certain structured format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other embodiments, pixel values are data structures and a pixel value can be associated with a pixel and can be a scalar value, a vector, or another data structure associated with a corresponding pixel. That pixel value might include color values, or not, and might include depth values, alpha values, weight values, object identifiers, or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 FPS, 50 FPS, 140 FPS, or other frame rates. In some embodiments, frames are interlaced or otherwise presented for display, but for clarity of description, in some examples, it is assumed that a video frame has one specified display time. Other variations might be contemplated, however.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for storytelling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist might specify position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 17, a live action capture system 1702 captures a live scene that plays out on a stage 1704. Live action capture system 1702 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 1706(1) and 1706(2) capture the scene, while in some systems, there might be other sensor(s) 1708 that capture information from the live scene (e.g., infrared cameras, infrared sensors, motion capture ("mo-cap") detectors, etc.). On stage 1704, there might be human actors, animal actors, inanimate objects, background objects, and possibly an object such as a green screen 1710 that is designed to be captured in a live scene recording in such a way that it is easily overlaid with computer-generated imagery. Stage 1704 might also contain objects that serve as fiducials, such as fiducials 1712(1)-(3), that might be used post-capture to determine where an object was during capture. A live action scene might be illuminated by one or more lights, such as an overhead light 1714.

During or following the capture of a live action scene, live action capture system 1702 might output live action footage to a live action footage storage 1720. A live action processing system 1722 might process live action footage to generate data about that live action footage and store that data into a live action metadata storage 1724. Live action processing system 1722 might include computer processing capabilities, image processing capabilities, one or more processors, program code storage for storing program instructions executable by the one or more processors, as well as user input devices and user output devices, not all of which are shown. Live action processing system 1722 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 1714, as that might be useful in post-processing to match computer-generated lighting on objects that are computer-generated and overlaid on the live action footage. Live action processing system 1722 might operate autonomously, perhaps based on predetermined program instructions, to generate and output the live action metadata upon receiving and inputting the live action footage. The live action footage can be camera-captured data as well as data from other sensors.

An animation creation system 1730 is another part of visual content generation system 1700. Animation creation system 1730 might include computer processing capabilities, image processing capabilities, one or more processors, program code storage for storing program instructions executable by the one or more processors, as well as user input devices and user output devices, not all of which are shown. Animation creation system 1730 might be used by animation artists, managers, and others to specify details, perhaps programmatically and/or interactively, of imagery to be generated. From user input and data from a database or other data source, indicated as a data store 1732, animation creation system 1730 might generate and output data representing objects (e.g., a horse, a human, a ball, a teapot, a cloud, a light source, a texture, etc.) to an object storage 1734, generate and output data representing a scene into a scene description storage 1736, and/or generate and output data representing animation sequences to an animation sequence storage 1738.

Scene data might indicate locations of objects and other visual elements, values of their parameters, lighting, camera location, camera view plane, and other details that a rendering engine 1750 might use to render computer-generated imagery (CGI). For example, scene data might include the locations of several articulated characters, background objects, lighting, etc., specified in a two-dimensional space, three-dimensional space, or other dimensional space (such as a 2.5-dimensional space, three-quarter dimensions, pseudo-3D spaces, etc.) along with locations of a camera viewpoint and view plane from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 1730 might be interactive, allowing a user to read in animation sequences, scene descriptions, object details, etc., and edit those, possibly returning them to storage to update or replace existing data. As an example, an operator might read in objects from object storage into a baking processor 1742 that would transform those objects into simpler forms and return those to object storage 1734 as new or different objects. For example, an operator might read in an object that has dozens of specified parameters (movable joints, color options, textures, etc.), select some values for those parameters, and then save a baked object that is a simplified object with now-fixed values for those parameters.

Rather than requiring user specification of each detail of a scene, data from data store 1732 might be used to drive object presentation. For example, if an artist is creating an animation of a spaceship passing over the surface of the Earth, instead of manually drawing or specifying a coastline, the artist might specify that animation creation system 1730 is to read data from data store 1732 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2," at a lower level (e.g., "move the elbow joint 2.5 degrees per frame"), or even at a very high level (e.g., "character A should move, consistent with the laws of physics that are given for this scene, from point P1 to point P2 along a specified path").

Animation sequences in an animated scene might be specified by what happens in a live action scene. An animation driver generator 1744 might read in live action metadata, such as data representing movements and positions of body parts of a live actor during a live action scene. Animation driver generator 1744 might generate corresponding animation parameters to be stored in animation sequence storage 1738 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 1722. Animation driver generator 1744 might convert that movement data into specifications of how joints of an articulated CGI character are to move over time.

A rendering engine 1750 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 1750 might include computer processing capabilities, image processing capabilities, one or more processors, program code storage for storing program instructions executable by the one or more processors, as well as user input devices and user output devices, not all of which are shown.

Visual content generation system 1700 can also include a merging system 1760 that merges live footage with animated content. The live footage might be obtained and input by reading from live action footage storage 1720 to obtain live action footage, by reading from live action metadata storage 1724 to obtain details such as presumed segmentation in captured images segmenting objects in a live action scene from their background (perhaps aided by the fact that green screen 1710 was part of the live action scene), and by obtaining CGI imagery from rendering engine 1750.

A merging system 1760 might also read data from rulesets for merging/combining storage 1762. A very simple example of a rule in a ruleset might be "obtain a full image including a two-dimensional pixel array from live footage, obtain a full image including a two-dimensional pixel array from rendering engine 1750, and output an image where each pixel is a corresponding pixel from rendering engine 1750 when the corresponding pixel in the live footage is a specific color of green, otherwise output a pixel value from the corresponding pixel in the live footage."

Merging system 1760 might include computer processing capabilities, image processing capabilities, one or more processors, program code storage for storing program instructions executable by the one or more processors, as well as user input devices and user output devices, not all of which are shown. Merging system 1760 might operate autonomously, following programming instructions, or might have a user interface or programmatic interface over which an operator can control a merging process. In some embodiments, an operator can specify parameter values to use in a merging process and/or might specify specific tweaks to be made to an output of merging system 1760, such as modifying boundaries of segmented objects, inserting blurs to smooth out imperfections, or adding other effects. Based on its inputs, merging system 1760 can output an image to be stored in a static image storage 1770 and/or a sequence of images in the form of video to be stored in an animated/combined video storage 1772.

Thus, as described, visual content generation system 1700 can be used to generate video that combines live action with computer-generated animation using various components and tools, some of which are described in more detail herein. While visual content generation system 1700 might be useful for such combinations, with suitable settings, it can be used for outputting entirely live action footage or entirely CGI sequences. The code may also be provided and/or carried by a transitory computer-readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

One embodiment might include a carrier medium carrying image data or other data having details generated using the methods described herein. The carrier medium can comprise any medium suitable for carrying the image data or other data, including a storage medium, e.g., solid-state memory, an optical disk or a magnetic disk, or a transient medium, e.g., a signal carrying the image data such as a signal transmitted over a network, a digital signal, a radio frequency signal, an acoustic signal, an optical signal, or an electrical signal.

Computer System

Figure 18:
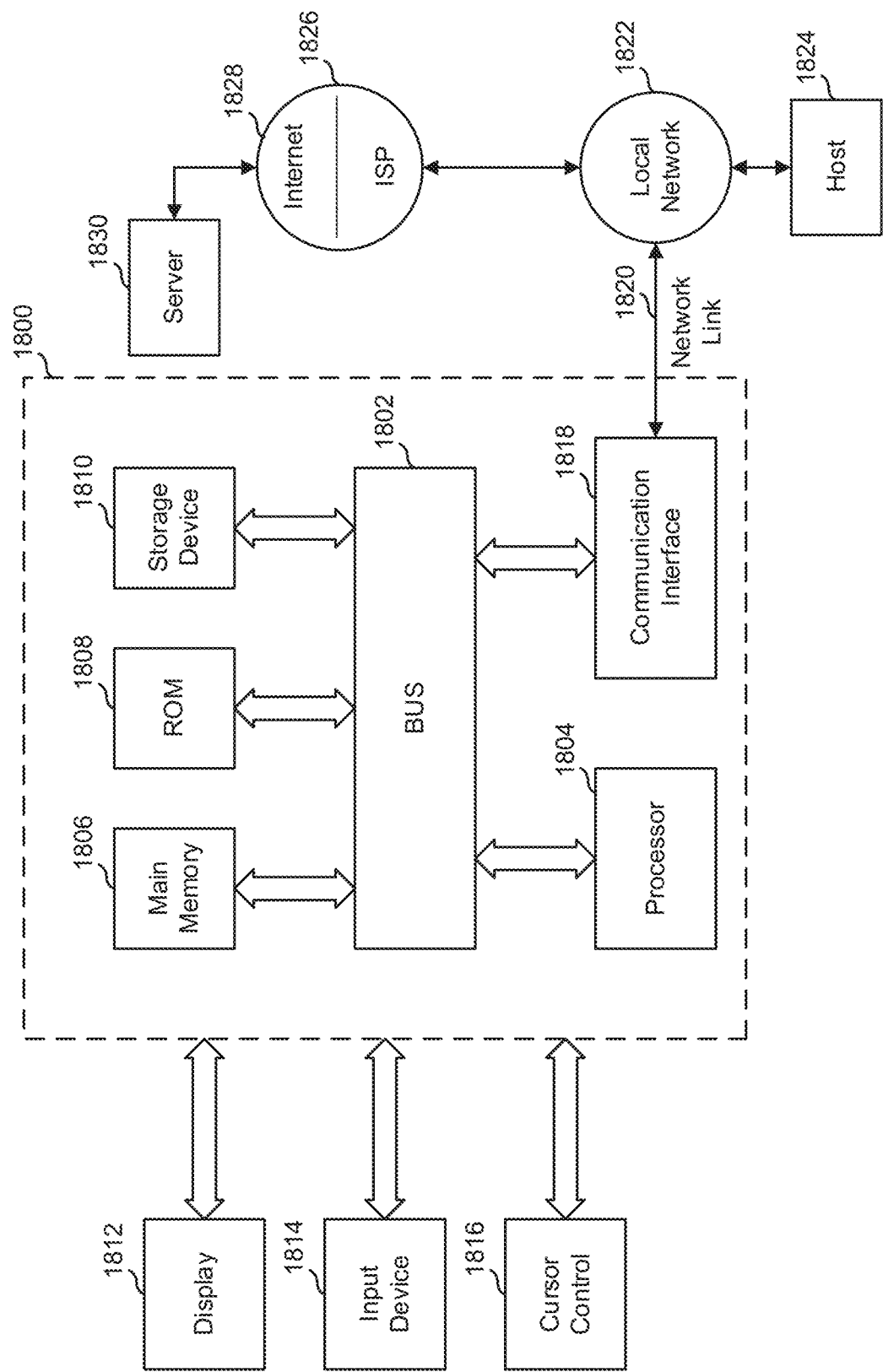
FIG. 18 is a block diagram that illustrates a computer system upon which the computer systems of the systems described herein and/or an example visual content generation system may be implemented.

FIG. 18 is a block diagram that illustrates a computer system 1800 upon which the computer systems of the systems described herein and/or visual content generation system 1700 (see FIG. 17) may be implemented. Computer system 1800 includes a bus 1802 or other communication mechanism for communicating information, and a processor 1804 coupled with bus 1802 for processing information. Processor 1804 may be, for example, a general-purpose microprocessor.

Computer system 1800 also includes a main memory 1806, such as a random-access memory (RAM) or other dynamic storage device, coupled to bus 1802 for storing information and instructions to be executed by processor 1804. Main memory 1806 may also be used for storing temporary variables or other intermediate information during execution of instructions to be executed by processor 1804. Such instructions, when stored in non-transitory storage media accessible to processor 1804, render computer system 1800 into a special-purpose machine that is customized to perform the operations specified in the instructions.

Computer system 1800 further includes a read only memory (ROM) 1808 or other static storage device coupled to bus 1802 for storing static information and instructions for processor 1804. A storage device 1810, such as a magnetic disk or optical disk, is provided and coupled to bus 1802 for storing information and instructions.

Computer system 1800 may be coupled via bus 1802 to a display 1812, such as a computer monitor, for displaying information to a computer user. An input device 1814, including alphanumeric and other keys, is coupled to bus 1802 for communicating information and command selections to processor 1804. Another type of user input device is a cursor control 1816, such as a mouse, a trackball, or cursor direction keys for communicating direction information and command selections to processor 1804 and for controlling cursor movement on display 1812. This input device typically has two degrees of freedom in two axes, a first axis (e.g., x) and a second axis (e.g., y), that allows the device to specify positions in a plane.

Computer system 1800 may implement the techniques described herein using customized hard-wired logic, one or more ASICs or FPGAs, firmware and/or program logic which in combination with the computer system causes or programs computer system 1800 to be a special-purpose machine. According to one embodiment, the techniques herein are performed by computer system 1800 in response to processor 1804 executing one or more sequences of one or more instructions contained in main memory 1806. Such instructions may be read into main memory 1806 from another storage medium, such as storage device 1810. Execution of the sequences of instructions contained in main memory 1806 causes processor 1804 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may include non-volatile media and/or volatile media. Non-volatile media includes, for example, optical or magnetic disks, such as storage device 1810. Volatile media includes dynamic memory, such as main memory 1806. Common forms of storage media include, for example, a floppy disk, a flexible disk, a hard disk, a solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, or any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 1802. Transmission media can also take the form of acoustic or light waves, such as those generated during radio-wave and infrared data communications.

Various forms of media may be involved in carrying one or more sequences of one or more instructions to processor 1804 for execution. For example, the instructions may initially be carried on a magnetic disk or solid-state drive of a remote computer. The remote computer can load the instructions into its dynamic memory and send the instructions over a network connection. A modem or network interface local to computer system 1800 can receive the data. Bus 1802 carries the data to main memory 1806, from which processor 1804 retrieves and executes the instructions. The instructions received by main memory 1806 may optionally be stored on storage device 1810 either before or after execution by processor 1804.

Computer system 1800 also includes a communication interface 1818 coupled to bus 1802. Communication interface 1818 provides a two-way data communication coupling to a network link 1820 that is connected to a local network 1822. For example, communication interface 1818 may be a network card, a modem, a cable modem, or a satellite modem to provide a data communication connection to a corresponding type of telephone line or communications line. Wireless links may also be implemented. In any such implementation, communication interface 1818 sends and receives electrical, electromagnetic, or optical signals that carry digital data streams representing various types of information.

Network link 1820 typically provides data communication through one or more networks to other data devices. For example, network link 1820 may provide a connection through local network 1822 to a host computer 1824 or to data equipment operated by an Internet Service Provider (ISP) 1826. ISP 1826 in turn provides data communication services through the worldwide packet data communication network now commonly referred to as the "Internet" 1828. Local network 1822 and Internet 1828 both use electrical, electromagnetic, or optical signals that carry digital data streams. The signals through the various networks and the signals on network link 1820 and through communication interface 1818, which carry the digital data to and from computer system 1800, are example forms of transmission media.

Computer system 1800 can send messages and receive data, including program code, through the network(s), network link 1820, and communication interface 1818. In the Internet example, a server 1830 might transmit a requested code for an application program through the Internet 1828, ISP 1826, local network 1822, and communication interface 1818. The received code may be executed by processor 1804 as it is received, and/or stored in storage device 1810, or in other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided and/or carried by a transitory computer-readable medium, e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood within the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

REMARKS

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can BE recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or in a continuing application.

We claim:

1. A method comprising:
presenting multiple images to a light receiver via a display,
   wherein the display is configured to present the multiple images at a first frame rate,
   wherein the light receiver is configured to operate at a second frame rate proportional to the first frame rate;
providing a mask corresponding to one or more images among the multiple images,
   wherein the mask indicates a portion of the one or more images among the multiple images to include in an output image; and
causing an increase in an apparent resolution of the display in proportion to a number of multiple images presented on the display by causing a combination, based on the mask, of the one or more images among the multiple images to obtain the output image.

2. The method of claim 1, comprising:
creating an impression of a motion blur by:
   providing an indication of a particular time, a position associated with the light receiver at the particular time, and a position of the display at the particular time;
   based on the indication of the particular time, providing one or more images among the multiple images presented on the display;
   based on the position associated with the light receiver, and the position of the display, causing a determination of one or more regions associated with the one or more images that corresponds to a pixel associated with the light receiver;
   providing one or more colors of the one or more regions associated with the one or more images; and
   causing a combination of the one or more colors of the one or more regions associated with the one or more images to obtain the impression of the motion blur.

3. The method of claim 1, comprising:
causing an identification in the output image of a representation of an object and an image among the multiple images presented on the display,
   wherein the object is not a part of the image presented on the display;

for a region in the output image belonging to the representation of the object causing an obtaining of a corresponding region in at least a subset of images among the multiple images to obtain multiple corresponding regions;
causing a combining of the multiple corresponding regions to obtain a combined region; and
causing a replacement of the representation of the object with the combined region.

4. The method of claim 3, wherein causing the identification in the output image of the representation of the object comprises:
causing an obtaining of a first image recorded by the light receiver;
causing an obtaining of at least a portion of a second image presented on the display and within a field of view of the light receiver;
causing a determination of whether a first region of the first image corresponds to a second region of the portion of the second image; and
upon determining that the first region and the second region do not correspond, causing the identification of the first region as at least a portion of the representation of the object.

5. The method of claim 1, wherein causing the combination of the one or more images comprises:
based on the mask, cause a determination of a first region of a first image among the multiple images to include in the output image and a second region of a second image among the multiple images to include in the output image; and
cause the combination of the first region and the second region to obtain the output image.

6. A system comprising:
at least one hardware processor; and
at least one non-transitory memory storing instructions, which, when executed by the at least one hardware processor, cause the system to:
present multiple images to a light receiver via a display,
wherein the display is configured to present the multiple images at a first frame rate,
wherein the light receiver is configured to operate at a second frame rate proportional to the first frame rate;
providing a mask corresponding to one or more images among the multiple images,
wherein the mask indicates a portion of the one or more images among the multiple images to include in an output image; and
cause an increase in an apparent resolution of the display in proportion to a number of multiple images presented on the display by causing a combination, based on the mask, of the one or more images among the multiple images to obtain the output image.

7. The system of claim 6, comprising the instructions to:
provide an indication of a particular time, a position associated with the light receiver at the particular time, and a position of the display at the particular time;
based on the indication of the particular time, provide an image among the multiple images presented on the display;
based on the position associated with the light receiver, and the position of the display, cause a determination of a region associated with the image that corresponds to a pixel associated with the light receiver; and
provide a color associated with the region associated with the image.

8. The system of claim 6, comprising instructions to:
cause identification in the output image of a representation of an object and an image among the multiple images presented on the display,
wherein the object is not a part of the image presented on the display;
for a region in the output image belonging to the representation of the object cause an obtaining of a corresponding region in at least a subset of images among the multiple images to obtain multiple corresponding regions;
cause a combination of the multiple corresponding regions to obtain a combined region; and
cause a replacement of the representation of the object with the combined region.

9. The system of claim 8, the instructions to cause an identification in the output image of the representation of the object comprising instructions to:
cause an obtaining of a first image recorded by the light receiver;
cause an obtaining of at least a portion of a second image presented on the display and within a field of view of the light receiver;
cause a determination of whether a first region of the first image corresponds to a second region of the portion of the second image; and
upon determining that the first region and the second region do not correspond, cause an identification of the first region as at least a portion of the representation of the object.

10. The system of claim 6, wherein the instructions to provide the mask comprise instructions to:
provide multiple masks,
wherein each mask among the multiple masks graphically indicates the portion of the one or more images among the multiple images to at least partially included in the output image.

11. The system of claim 6, wherein the instructions to cause the combination of the one or more images comprise instructions to:
based on the mask, cause a determination of a first region of a first image among the multiple images and a second region of a second image among the multiple images; and
cause the combination of the first region and the second region to obtain the output image.

12. The system of claim 6, wherein the instructions to cause the combination of the one or more images comprise instructions to:
based on the mask, cause a determination of a first region of a first image among the multiple images to include in the output image and a second region of a second image among the multiple images to include in the output image; and
cause the combination of the first region and the second region to obtain the output image by interpolating, based on the mask, between the first region and the second region.

13. At least one computer-readable storage medium, excluding transitory signals and carrying instructions, which, when executed by at least one data processor of a system, causes the system to:
present multiple images to a light receiver via a display,
wherein the display is configured to present the multiple images at a first frame rate,
wherein the light receiver is configured to operate at a second frame rate proportional to the first frame rate;

providing a mask corresponding to one or more images among the multiple images,
  wherein the mask indicates a portion of the one or more images among the multiple images to include in an output image; and
cause an increase in an apparent resolution of the display in proportion to a number of multiple images presented on the display by causing a combination, based on the mask, of the one or more images among the multiple images to obtain the output image.

14. The at least one computer-readable storage medium of claim 13, comprising the instructions to:
  provide an indication of a particular time, a position associated with the light receiver at the particular time, and a position of the display at the particular time;
  for each pixel associated with the light receiver perform steps including:
    based on the indication of the particular time, provide an image among the multiple images;
    based on the position associated with the light receiver, and the position of the display, cause a determination of a region associated with the image that corresponds to a pixel associated with the light receiver; and
    cause obtaining of a color associated with the region associated with the image.

15. The at least one computer-readable storage medium of claim 13, comprising instructions to:
  cause an identification in the output image of a representation of an object and an image among the multiple images presented on the display,
    wherein the object is not a part of the image presented on the display;
  for a region in the output image belonging to the representation of the object cause obtaining of a corresponding region in at least a subset of images among the multiple images to obtain multiple corresponding regions;
  cause a combining of the multiple corresponding regions to obtain a combined region; and
  cause a replacing of the representation of the object with the combined region.

16. The at least one computer-readable storage medium of claim 15, the instructions to cause the identification in the output image of the representation of the object comprising instructions to:
  cause obtaining of a first image recorded by the light receiver;
  cause obtaining at least a portion of a second image presented on the display and within a field of view of the light receiver;
  cause determination of whether a first region of the first image corresponds to a second region of the at least the portion of the second image; and
  upon determining that the first region and the second region do not correspond, cause identifying of the first region as at least a portion of the representation of the object.

17. The at least one computer-readable storage medium of claim 13, wherein the instructions to provide the mask comprise instructions to:
  provide the mask numerically indicating the portion of the one or more images among the multiple images to include in the output image.

18. The at least one computer-readable storage medium of claim 13, wherein the instructions to cause a combination of the one or more images comprise instructions to:
  based on the mask cause a determination of a first region of a first image among the multiple images and a second region of a second image among the multiple images; and
  cause a combination of the first region and the second region to obtain the output image.

19. The at least one computer-readable storage medium of claim 13, wherein the instructions to cause a combination of the one or more images comprise instructions to:
  based on the mask, cause a determination of a first region of a first image among the multiple images to include in the output image and a second region of a second image among the multiple images to include in the output image; and
  cause a combination of the first region and the second region to obtain the output image by interpolating, based on the mask, between the first region and the second region.

20. The at least one computer-readable storage medium of claim 13, comprising instructions to:
  create an impression of a motion blur by:
    providing an indication of a particular time, a position associated with the light receiver at the particular time, and a position of the display at the particular time;
    based on the indication of the particular time, providing one or more images among the multiple images presented on the display;
    based on the position associated with the light receiver, and the position of the display, causing a determination of one or more regions associated with the one or more images that corresponds to a pixel associated with the light receiver;
    providing one or more colors of the one or more regions associated with the one or more images; and
    causing a combination of the one or more colors of the one or more regions associated with the one or more images to obtain the impression of the motion blur.

* * * * *